(12) United States Patent
Jabandzic et al.

(10) Patent No.: US 12,432,763 B2
(45) Date of Patent: Sep. 30, 2025

(54) DEVICE AND METHOD FOR MEDIUM ACCESS CONTROL

(71) Applicants: IMEC VZW, Leuven (BE); UNIVERSITEIT GENT, Ghent (BE)

(72) Inventors: Irfan Jabandzic, Leuven (BE); Spilios Giannoulis, Leuven (BE); Ingrid Moerman, Leuven (BE)

(73) Assignees: IMEC VZW, Leuven (BE); UNIVERSITEIT GENT, Ghent (BE)

( * ) Notice: Subject to any disclaimer, the term of this patent is extended or adjusted under 35 U.S.C. 154(b) by 804 days.

(21) Appl. No.: 17/619,056

(22) PCT Filed: Jun. 29, 2020

(86) PCT No.: PCT/EP2020/068259
§ 371 (c)(1),
(2) Date: Dec. 14, 2021

(87) PCT Pub. No.: WO2021/004824
PCT Pub. Date: Jan. 14, 2021

(65) Prior Publication Data
US 2022/0304007 A1    Sep. 22, 2022

(30) Foreign Application Priority Data

Jul. 5, 2019  (EP) .................................... 19184722

(51) Int. Cl.
*H04W 72/12*  (2023.01)
*H04W 72/50*  (2023.01)

(52) U.S. Cl.
CPC ................. *H04W 72/535* (2023.01)

(58) Field of Classification Search
CPC . H04W 72/02; H04W 72/0453; H04W 72/20; H04W 72/0446; H04W 72/04;
(Continued)

(56) References Cited

U.S. PATENT DOCUMENTS

| | | | |
|---|---|---|---|
| 2015/0282166 A1* | 10/2015 | Zhao | H04W 28/021 370/336 |
| 2016/0021006 A1* | 1/2016 | Vasseur | H04L 45/04 370/235 |

(Continued)

FOREIGN PATENT DOCUMENTS

WO    2019014758 A1    1/2019

OTHER PUBLICATIONS

International Search Report with Written Opinion from PCT Application No. PCT/EP2020/068259, Aug. 31, 2020.
(Continued)

*Primary Examiner* — Romani Ohri
(74) *Attorney, Agent, or Firm* — Workman Nydegger

(57) ABSTRACT

A device for medium access control in a node of a wireless communication network with shared medium, including: a registration module, configured to maintain in a scheduling table the use of slots, including timeslots and/or frequency channels; an information exchange module, configured to collect slot usage information indicative for the use of slots by neighbor nodes in the range of the node, this slot usage information specifying use of a slot for transmission by a neighbor node and/or use of a slot for receipt by a neighbor node; a slot allocation module, configured to allocate a slot for communication with a neighbor node by consulting the scheduling table in a slot allocation procedure with a neighbor node, resulting in an allocated slot.

15 Claims, 23 Drawing Sheets

(58) Field of Classification Search
CPC ... H04W 72/56; H04W 72/53; H04W 72/044; H04W 72/30; H04W 72/563
See application file for complete search history.

(56) References Cited

U.S. PATENT DOCUMENTS

| | | | |
|---|---|---|---|
| 2018/0302911 A1* | 10/2018 | Aijaz | H04L 12/189 |
| 2019/0357214 A1* | 11/2019 | Kurian | H04W 16/04 |
| 2019/0369918 A1* | 12/2019 | Cho | G06F 3/0608 |
| 2020/0186187 A1* | 6/2020 | Suzuki | H04L 5/0012 |

OTHER PUBLICATIONS

Extended European Search Report from corresponding EP Application No. 19184722.7, Dec. 10, 2019.
Zhu et al., "A Five-Phase Reservation Protocol (FPRP) for Mobile Ad Hoc Networks," Proceedings IEEE INFOCOM'98 Conference on Computer Communications Seventeenth Annual Joint Conference of the IEEE Computer and Communications Societies Gateway to the 21st Century, vol. 1, Mar. 29, 1998, pp. 322-331.
Kamruzzaman et al., "Dynamic TDMA Slot Reservation Protocol for Cognitive Radio Ad Hoc Networks", Proceedings of the 13th International Conference on Computer and Information Technology (ICCIT 2010), Dec. 23-25, 2010, pp. 142-147.
Dezfouli et al., "DICSA: Distributed and Concurrent Link Scheduling Algorithm for Data Gathering in Wireless Sensor Networks," Ad Hoc Networks, vol. 25, Part A, Sep. 27, 2014, pp. 54-71.
Jabandzic et al., "Enabling Generic Wireless Coexistence Through Technology-Agnostic Dynamic Spectrum Access," Wireless Personal Communications, vol. 106, Mar. 20, 2019, pp. 151-177.

* cited by examiner

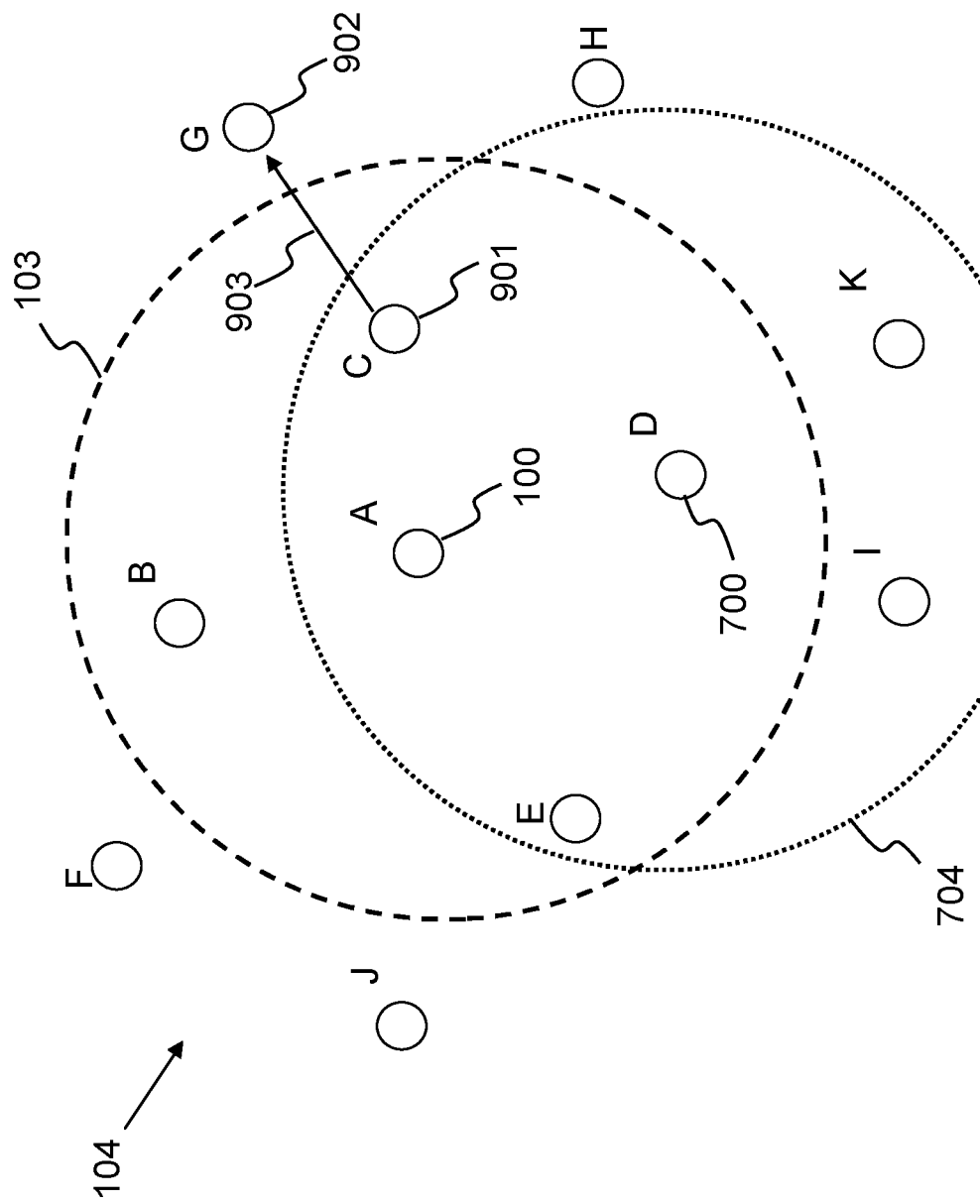

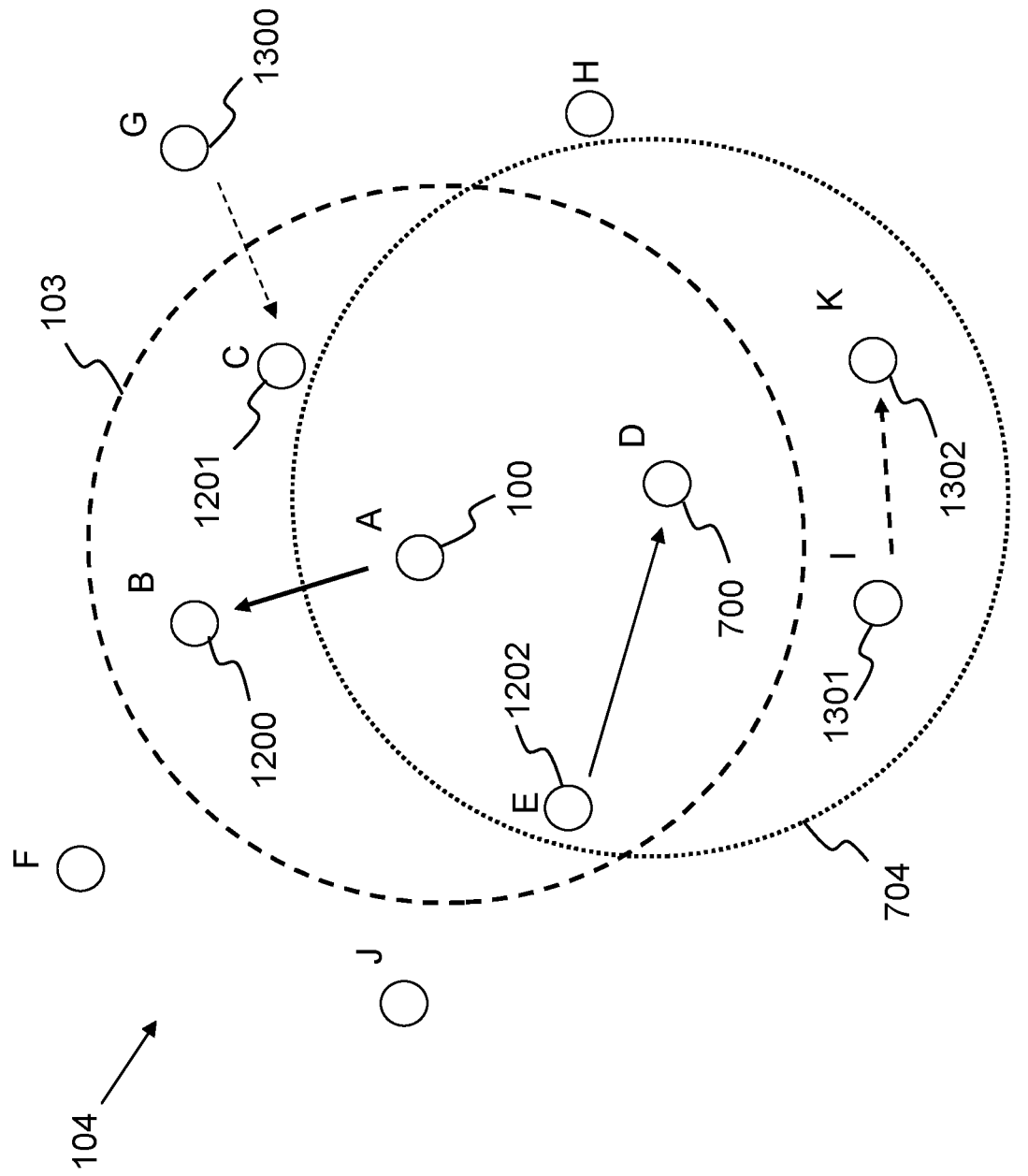

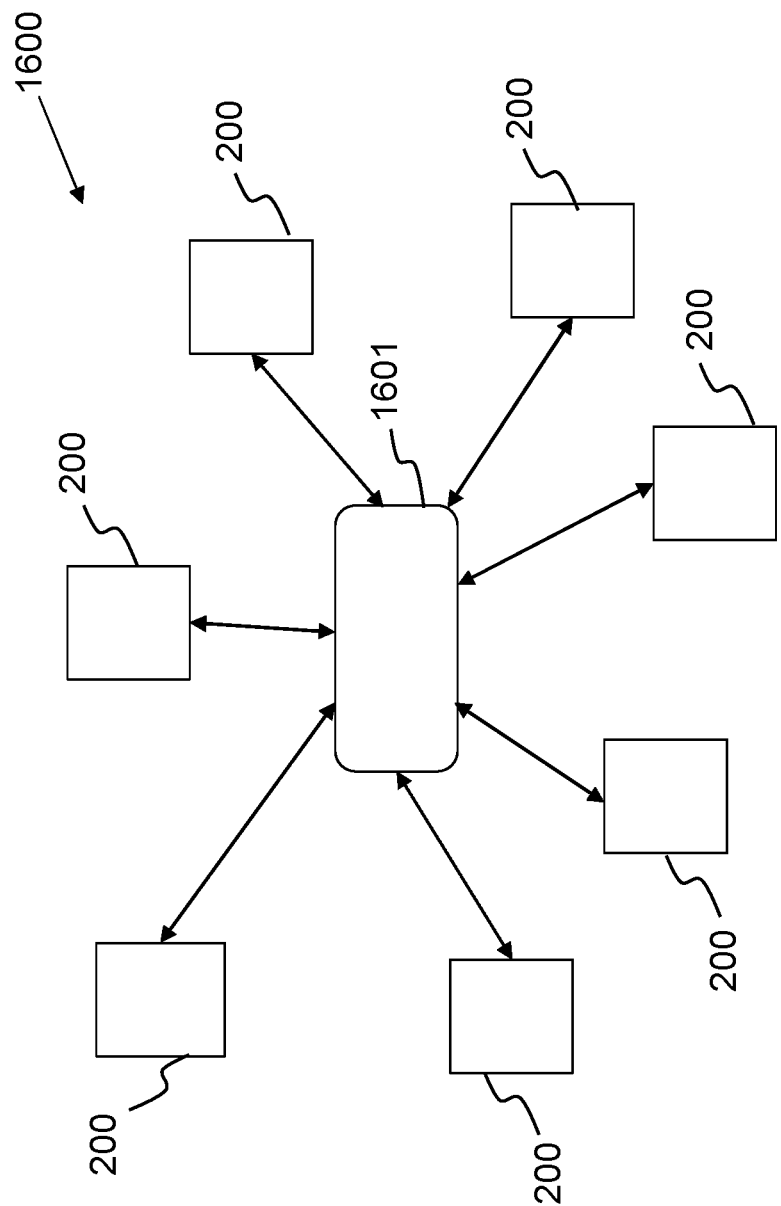

DEVICE AND METHOD FOR MEDIUM ACCESS CONTROL

FIELD OF THE INVENTION

The present invention generally relates to the field of medium access control of wireless communication networks using a shared medium. In particular, the invention relates to a solution that allows for a reliable and efficient medium access control, while optimally making use of the available spectrum.

BACKGROUND OF THE INVENTION

When a wireless communication network operates in a time-shared medium, a Medium Access Control (MAC) protocol is required to manage the access of various users in the network to the shared medium. For example, Time Division Multiple Access (TDMA) allows several users to share the same frequency channel by assigning timeslots to different transmitters in a repetitive way. The users transmit in rapid succession, one after the other, each using their own timeslot(s). Multi-frequency TDMA additionally controls the assignment of multiple frequency channels to various users, in order to efficiently share bandwidth resources.

A static allocation in a TDMA scheme only works if the topology of the wireless network is known in advance and does not change during the network's lifespan. Therefore, it is not applicable for an ad hoc wireless network, being a multi-hop wireless network without fixed infrastructure and possibly with mobile nodes. On the other hand, the multi-hop topology of an ad hoc network allows spatial reuse of the TDMA slots: as long as different nodes are sufficiently separated from each other physically, they can use the same timeslot since they do not interfere with each other. Consequently, there is a general need for protocols allowing for dynamic TDMA scheduling, where timeslot usage is dynamically repurposed in function of the actual demands and topology of a wireless ad hoc network. Furthermore, various applications also require a dynamic channel assignment, for example when licensed spectral bands are opportunistically used by an ad hoc wireless network.

Dynamic TDMA scheduling can be implemented either in a centralised model, or in a distributed configuration. In the centralised approach, one or more central control nodes are needed to collect information about the state of the network and to make scheduling decisions. As large multi-hop wireless networks require a huge amount of control messages to be exchanged with the central node, a centralised model does not provide a scalable solution. In a distributed model, decision-making is done at the node level without requiring any central control; nodes are exchanging information about slot usage with their neighbours in order to decide on slot allocation.

Several solutions of distributed protocols for dynamic TDMA scheduling have been proposed in the prior art. For example, in 'A Five-Phase Reservation Protocol (FPRP) for Mobile Ad Hoc Networks, Chenxi Zhu et al., IEEE 1998' a single channel TDMA protocol is disclosed. Each timeslot available for data communication has its own reservation slot. During a reservation slot, nodes contend for the associated data slot. A request for reservation transmitted by a node needs to be approved by its direct and two-hop away neighbours in order to allocate the requested timeslot. In this way, collisions of transmissions by nodes that cannot detect each other are avoided. A solution to the so-called hidden node problem is therefore provided. However, the proposed solution has several disadvantages. First, the disclosed protocol does not solve the so-called exposed node problem. The exposed node problem refers to the issue that timeslots are considered to be unavailable for transmission by a node A because a neighbour node is already transmitting within that timeslot, even though the latter transmission is to a receiver being out of range of node A willing to do the reservation. As in this prior-art solution a timeslot reservation will not be accepted as soon as a neighbour already reserved it for transmission, independently from the actual position of the associated receiver, it suffers from the hidden node problem. As a result, the available spectrum is not fully used, leading to a reduced throughput if bandwidth is scarce. A second disadvantage of this prior-art solution is that reservation of slots is done based on requests and received feedback from other nodes. As the slot usage information regarding his neighbours is not stored by the node, reservation of a slot becomes more complex. As a result, control packet overhead becomes huge, certainly when a large number of nodes is involved. Moreover, the reservation procedure with each data slot having its own reservation slot is sequential in nature, preventing a more efficient parallel reservation of slots. Finally, the need to transmit reservation information to nodes being two hops away enlarges the overhead associated with an allocation procedure.

Another example of a distributed protocol for a single channel TDMA scheme is disclosed in 'DICSA: Distributed and concurrent link scheduling algorithm for data gathering in wireless sensor networks, Behnam Dezfouli et al., Ad Hoc Networks 25 (2015)'. Here, a list of forbidden slots is stored per node and the protocol enables nodes to participate concurrently in slot reservation procedures, both aspects contributing to a more efficient slot allocation procedure. However, the proposed protocol requires affirmative response from all the neighbouring nodes to reserve a requested slot. Therefore, it requires a high number of control packets to be exchanged for one slot allocation. Moreover, as slots used by neighbour nodes for transmission only or for reception only are considered as forbidden, the exposed node problem is not solved. Therefore, no full advantage is taken of the spatial reuse of slots, and no optimal utilization of the available spectrum is achieved.

The prior art document 'Dynamic TDMA Slot Reservation Protocol for Cognitive Radio Ad Hoc Networks, S. M. Kamruzzaman et al., ICCIT 2010' discloses a multi-channel protocol that divides the spectrum in channel-timeslot pairs. A frame table is kept by a node indicating the status of communication segments, a communication segment corresponding to a specific channel within a specific timeslot. Based on collected neighbour information, each node updates the status of the communication segments in its frame table as occupied or free. The exchange of control messages between nodes is done using a common control channel, meaning that one frequency channel is uniquely reserved for control. The use of a common control channel has the disadvantage that it cannot be used for data communication, even when the control channel is underutilised. On the other hand, situations may occur where the channel becomes fully saturated when lots of control messages need to be exchanged. A second disadvantage of the proposed prior-art solution is that no recovery mechanism is provided in case of failure of notifying neighbours about slot allocation/removal procedures, which may result in collisions due to double allocation of slots. Finally, also here no solution for the exposed node problem is proposed, as the protocol requires that all neighbour nodes of the intended receiver, except for the intended transmitter, should remain silent on the particular channel during a given timeslot. This way, a node may be prevented from transmitting in a timeslot/frequency channel even if no neighbouring node is listening in the considered timeslot/frequency channel.

Finally, US2018/0302911 discloses a distributed method for scheduling transmissions in a wireless network. The multi-hop network has a tree topology, with a sink node as the root of the tree. Every leave node in the tree topology may have one or more child nodes and only one parent node. A child node can send messages to the sink node via its parent node. For uplink scheduling, slots need to be allocated for a transmission from a specific child node towards the sink node. In the disclosed method, the child node first determines a preliminary schedule specifying a timeslot for a transmission to its direct parent. This preliminary schedule is sent to the parent node who checks whether it conflicts with already scheduled transmissions. For this purpose, the parent node keeps a record of scheduled transmissions, which is updated by the parent node by listening for signals indicating scheduled timeslots for transmission between nodes in the network. Based on the record of scheduled transmissions, the parent node may approve the preliminary schedule, or propose an updated schedule. Approval is therefore needed from a parent node having information concerning nodes being more than one hop away. This results in additional overhead in a slot allocation procedure. Moreover, execution time of the protocol is enlarged due to the fact that uplink and downlink scheduling are not performed simultaneously but in a sequential way. Finally, the method requires knowledge of the hierarchical position of the nodes in the tree topology, and is therefore only applicable to networks with such a specific tree topology.

Generally spoken, most solutions known in the prior art are able to avoid collisions and internal interferences, but often they require a lot of overhead related to control or specific knowledge about the topology. This leads to increased latency and energy use. On the other hand, the available spectrum is not fully utilized, either because an unnecessarily large part is reserved for control, or because the exposed node problem prevents to allocate non-interfering timeslots. As bandwidth is often scarce, this results in a decreased throughput.

It is an objective of the present invention to disclose a device and method for medium access control, that resolves the above described shortcomings of prior-art solutions. More particularly, it is an objective to present a solution that allows for a scalable, reliable and efficient medium access control, while optimally making use of the available spectrum.

SUMMARY OF THE INVENTION

According to a first aspect of the present invention, the above identified objectives are realised by a device for medium access control in a node of a wireless communication network with shared medium, defined by claim 1, the device comprising:
- a registration module, configured to maintain in a scheduling table the use of slots, comprising timeslots and/or frequency channels;
- an information exchange module, configured to collect slot usage information indicative for the use of slots by neighbour nodes in the range of the node, and configured to update the scheduling table based on the slot usage information;
- a slot allocation module, configured to allocate a slot for communication with a neighbour node by consulting the scheduling table in a slot allocation procedure with the neighbour node, resulting in an allocated slot, and configured to update the scheduling table based on the allocated slot, wherein the scheduling table specifies slots used by neighbour nodes for transmission only, for reception only, and for both transmission and reception.

Thus, the invention concerns a device for medium access control in a node of a wireless communication network with shared medium. A wireless communication network is a network comprising multiple nodes being configured to mutually communicate in a wireless way. For example, it may be a wireless network using fixed infrastructure like networking hardware for access points. In another example, it may be an ad hoc wireless network, where no fixed infrastructure is used but each node participates in routing by forwarding data for other nodes. Optionally, the nodes of an ad hoc network may be mobile, meaning that nodes are free to move relatively to each other. Nodes may be e.g. vehicles, mobile devices like smartphones, robots, satellites, etc. Examples of ad hoc wireless networks are vehicular ad hoc networks, smart phone ad hoc networks, wireless mesh networks, wireless sensor networks, ad hoc networks of robots, disaster rescue ad hoc networks, etc.

Every node of the wireless communication network has one or more transceivers which may working in full-duplex or half-duplex mode. Every node has the ability to communicate with other nodes within a certain range, due to the gradual attenuation of a transmitted wireless signal. Nodes being within the range of a specific node are defined as the neighbour nodes of that specific node. The neighbour nodes are able to receive signals directly from the specific node, and signals transmitted by the neighbour nodes can be received directly by the specific node. Neighbour nodes are therefore defined as being one hop away from the node under consideration. Nodes being out of range of a specific node, cannot directly receive signals transmitted by that specific node. For such a communication, the message first has to be forwarded by a neighbour node. Nodes being two hops away from a specific node are defined as nodes where one intermediate node suffices to enable the communication. Typically, ad hoc wireless networks are multi hop networks, where nodes contribute in forwarding messages from one node to another in order to realise communication to a far-away nodes.

A wireless communication network with shared medium implies that the used medium, i.e. the available spectrum of frequency channel(s), is used in common by the nodes of the network. The medium may be time-shared, meaning that the use over time of a specific channel has to be coordinated between various nodes being close to each other in order to avoid interferences. Typically, in a time-shared medium a superframe comprising a number of timeslots is defined, to be executed in a repetitive way. The various timeslots are assigned to different transmitters to allow them to transmit in rapid succession, one after the other, each of them using their own timeslot(s). In another example, the medium may be frequency-shared, meaning that multiple frequency channels are available, and plural nodes can transmit simultaneously using different frequencies. In yet another example, the medium may be time- and frequency-shared. The medium may refer to a licensed spectrum, like e.g. the licensed 4G/LTE frequency bands, an unlicensed spectrum, like e.g. Wi-Fi, or a combination of a licensed and unlicensed spectrum.

A device for medium access control refers to a device that implements a protocol controlling the access to the shared medium. Controlling the access typically involves the assignment of timeslots and/or frequency channels to nodes that want to communicate. Concerning the invention, the medium access control is done in a distributed fashion in the nodes of the wireless network. Thus, every node of the network has its own device configured to do the medium access control of that node. This implies that medium access control is managed in a distributed way, without having a central entity overseeing the overall network. This avoids that all control messages concerning slot and/or channel allocation have to be communicated with a central system, thereby limiting the overhead related to control, avoiding a single point-of-failure and leading to improved performance with regard to throughput, latency and energy consumption. As all control is managed locally, at the level of individual nodes, a node does not need any knowledge regarding its network membership or the network size. This makes the device suitable for large networks, for different network topologies and for networks whose size and/or topology change dynamically. As such, the invention provides a generic, scalable and flexible solution.

The device comprises a registration module, configured to maintain in a scheduling table the use of slots, comprising timeslots and/or frequency channels. Maintaining a scheduling table implies that the registration module is configured to store a table, and that it provides functionalities to create, edit, delete and read entries in the table. The device of each node of the wireless network maintains its own scheduling table, so the content of the table shall differ from node to node. The information stored within the scheduling table concerns the use of slots. A slot may e.g. refer to a timeslot, a frequency channel, or a time-frequency slot. For example, in cases where only one frequency channel is available, like e.g. in a single channel TDMA network, the scheduling table may be a one-dimensional table keeping the information about the use of timeslots within a superframe. In another example, where FDMA is deployed in a wireless network, a one-dimensional scheduling table may be maintained, keeping the information about the use of plural frequency channels. In yet another example, where different timeslots as well as different frequency channels need to be assigned, the scheduling table may be two-dimensional, keeping information about the use of timeslot-channel pairs within a superframe. The information that is stored in the table specifies the use of slots. This may be use by the node itself, either for transmission or reception, or use by (a) neighbour node(s) either for transmission, for reception or for both. Keeping such information in a table maintained by the device of a node has the advantage that a node may consult the scheduling table at any time to get a view on free or used slots. This avoids that usage information has to be collected every time a node wants to allocate a slot, thereby leading to less overhead with regard to control.

The device comprises an information exchange module, configured to collect slot usage information indicative for the use of slots by neighbour nodes in the range of the node, this slot usage information specifying use of a slot for transmission by a neighbour node and/or use of a slot for receipt by a neighbour node. A neighbour node is a node within the range of the node under consideration, being able to receive signals directly from the node under consideration. Slot usage information refers to an indicator whether the slot is used by a neighbour node, and how, i.e. for transmission or reception. Various embodiments are possible regarding the collection of slot usage information by the information exchange module. For example, slot usage information may be collected by listening to control messages being exchanged between neighbour nodes during a slot allocation procedure. In another embodiment, slot usage information may be collected from scheduling tables that are shared by neighbour nodes. For example, a frequency channel or specific slots may be reserved for control, and broadcasting may be used to exchange control messages or to periodically share a scheduling table. The collected slot usage information by the information exchange module is used to update the scheduling table of the node under consideration.

For a specific slot, the slot usage information may indicate that the slot is used by a neighbour node for transmission and the slot is used by another neighbour node for reception. For example, two neighbour nodes of the node under consideration are using that slot to communicate with each other. In another example, a first neighbour node receives from a transmitter out of range of the node under consideration, and a second neighbour node transmits to a receiver out of range of the node under consideration, where both the first and second neighbour node are not in vicinity of each other. For another slot, the slot usage information may indicate that the slot is used by a neighbour node for transmission, but no neighbour node is using it for reception. This implies that the receiving node involved in this communication is not a neighbour node of the node under consideration. Similarly, if the slot usage information indicates that this slot is used by a neighbour node for reception, but no neighbour node uses it for transmission, this implies that the transmitting node is not a neighbour of the node under consideration. In this way, a node does not only know whether or not a slot is used by other nodes, but also whether neighbour nodes are using it for both receival and transmission. Having this more detailed information has the advantage that a better view is provided on the slots being actually available for transmission or reception. Indeed, when the slot usage information collected by node A indicates that a specific slot is used by a neighbour node B for transmission, but the receiving node C is out of the range of the node A and no other node within the range of node A is listening in the specific slot, this slot is available for transmission from node A, as node C is not able to hear what will be transmitted by A. Similarly, when the slot usage information indicates that a specific slot is used by neighbour node B for reception, but the transmitting node C is out of the range of the node A and no other node within the range of node A is transmitting in the specific slot, this slot is available for reception by node A from a neighbour node D that is out of range for node B. Moreover, as only slot usage information from neighbour nodes is required, no information from nodes being two hops away needs to be collected. This results in a more efficient medium access control. Finally, no knowledge is required concerning the topology of the network, node IDs, nodes' positions or their mutual hierarchy. Therefore, the method is applicable to any generic network, with any topology and even when the position of nodes changes continuously.

The device further comprises a slot allocation module, configured to allocate a slot for communication with a neighbour node by consulting the scheduling table in a slot allocation procedure with the neighbour node, resulting in an allocated slot. Thus, when a node wants to allocate a slot for communication with a neighbour node, a slot allocation procedure will be executed in which both the node and the neighbour node are involved. In this slot allocation procedure, both nodes will exchange information in order to agree on a slot to be allocated for the particular communication. During the slot allocation procedure, the node will consult its scheduling table. For example, a node may consult its scheduling table to select slots being available to propose for transmission to a neighbour node. In another example, a node may consult the scheduling table to decide which slots, being proposed by a neighbour node, may be accepted for reception. Once a slot has been agreed upon for allocation, the scheduling table is updated based on this allocated slot. This implies that information is added within the scheduling table regarding the use of a slot by the node itself. Possibly, also the type of use, i.e. transmission or receipt, may be provided in this information. In this way, the node keeps track on the slots that have yet been allocated for communications in which it is involved.

Consultation of the scheduling table during a slot allocation procedure allows a node to know whether a slot is free, or whether it is used by the node itself or by a neighbour node. Taking this information into account during slot allocation, avoids packet collisions of transmissions by nodes that cannot detect each other, and thus solves the hidden node problem. Therefore, successful data transmissions without collisions are guaranteed, thereby avoiding internal interferences and improving network performance in terms of effective throughput and delivery ratio.

Moreover, consultation of the scheduling table during a slot allocation procedure allows a node to know whether a slot is used for communication between neighbour nodes, or it is used for communication between a neighbour node and a node being out of range of the node under consideration. Taking into account during slot allocation that a slot is available for transmission if that slot is only used for transmission by a neighbour node, and that a slot is available for reception if that slot is only used for reception by a neighbour node, avoids that slots are unduly considered as being unavailable. Consequently, the exposed node problem is solved. This has the advantage that a complete utilization of the available spectrum is obtained, leading to an improved throughput.

Optionally, as is indicated by claim 2, the slot allocation module is configured to propose a slot for transmission to a neighbour node based on the scheduling table, the slot being selected from empty slots and slots used by the neighbour nodes for transmission only. Thus, when a node wants to allocate a slot for transmission to a neighbour node, a slot allocation procedure is executed in which the node will propose one or more slots to the neighbour node. Next, the proposed slots may be assessed by the neighbour node, and feedback about a selected slot for allocation may be received by the node under consideration. The one or more slots being proposed by the node are selected from empty slots and slots used by neighbour nodes for transmission only. An empty slot is a slot for which the corresponding information in the scheduling table shows that it has not been allocated for transmission or receipt by the node itself, and it is not used by any of the neighbour nodes. Proposing empty slots for transmission allows to avoid collisions and internal interferences. Hence, the hidden node problem is avoided. A slot used by neighbour nodes for transmission only is a slot for which the corresponding usage information in the scheduling table shows that a neighbour node uses this slot for transmission, but none of the neighbour nodes uses this slot for reception. This implies that the communication for which that particular slot is reserved, takes place between a neighbour node, and a receiver being out of range of the node under consideration. Therefore, this particular slot may still be used for transmission originating from the node under consideration. As such, the exposed node problem is avoided, contributing to a full utilization of the available spectrum.

Further optionally, as is indicated by claim 3, the slot allocation module is configured to accept a slot for reception from a neighbour node based on the scheduling table, the slot being selected from empty slots and slots used by the neighbour nodes for reception only. Thus, when a node wants to allocate a slot for reception from a neighbour node, a slot allocation procedure is executed in which the neighbour node will propose one or more slots, which are assessed by the node under consideration based on its scheduling table. A slot may be accepted for allocation if the slot is empty or the slot is used by neighbour nodes for reception only. An empty slot is a slot for which the corresponding information in the scheduling table shows that it has not been allocated for transmission or reception by the node itself, and it is not used by any of the neighbour nodes. Accepting empty slots for reception allows to avoid collisions and internal interferences. Hence, the hidden node problem is avoided. A slot used by neighbour nodes for reception only is a slot for which the corresponding usage information in the scheduling table shows that a neighbour node uses this slot for reception, but none of the neighbour nodes uses this slot for transmission. This implies that the communication for which that particular slot is reserved, takes place between a transmitter out of range of the node under consideration and a neighbour node. Therefore, this particular slot may still be used for reception at the node under consideration. As such, the exposed node problem is avoided, contributing to a full utilization of the available spectrum.

Optionally, as is indicated by claim 4, the slot allocation module is configured to release a slot allocated for communication in one or more of the following situations: when the slot remains idle for a predefined period, or when a predefined packet error rate is reached during communication within the slot. After a slot has been allocated for communication in a slot allocation procedure, the actual communication will take place within the allocated slot. Typically, a superframe of slots is considered, which is executed in a repetitive way. This allows different transmitters to transmit in rapid succession, one after the other, each using their own allocated slot. Based on monitoring the activity within a slot, over consecutive superframes, it may be decided that a slot needs to be released, i.e. making it available again for another allocation. Various situations may occur in which the allocated slot needs to be released. In a first situation, the communication between a transmitting and a receiving node has ended. This may be identified by a receiving node, by detecting that the slot remains idle within a predefined period of time. Typically, the scheduling table will be updated based on the release of an allocated slot. Releasing a slot when it remains idle for a predefined period, has the advantage that the released slot becomes available again for allocation by another node. In this way, medium access is controlled in a dynamic way, being responsive to actual changes in the network.

In another situation, a slot release may be initiated by a transmitting node, if monitoring of the data transfer in the slot shows that a packet error rate exceeds a predefined value. A packet error rate may e.g. be calculated based on acknowledgment statistics. Reaching a high packet error rate implies that the communication quality within that particular slot is low, e.g. due to the use of this slot by an external user. Monitoring a packet error rate has therefore the advantage that external interferences may be detected. Moreover, the disturbance may be solved by releasing the slot and possibly moving the communication to a newly allocated slot. Typically, the scheduling table will be updated based on the release of an allocated slot and possibly based on the newly allocated slot. In this way, slots are dynamically released and possibly moved, allowing for a non-interfering cooperation with another network in the same shared medium.

Optionally, as is indicated by claim 5, slot usage information is collected based on control messages transmitted by neighbour nodes during slot allocation. Control messages refers to messages being exchanged between nodes during a slot allocation procedure, e.g. involving the proposal of available slots or the feedback about a selected slot. For example, broadcasting may be used to exchange control messages between nodes. By listening to control messages exchanged by neighbour nodes on the broadcast channel, the information exchange module may collect slot usage information, i.e. information on the use of slots by neighbour nodes. This has the advantage that slot usage information can be collected in an easy way, without requiring additional overhead for control. This contributes to an efficient medium access control. Moreover, slot usage information is collected at the same time as a slot allocation takes place. Therefore, no additional delays are introduced, allowing a node to have the most actual slot usage information in its scheduling table. This contributes to a reliable and effective medium access control, and allows to solve the hidden as well as the exposed node problem. Optionally, control messages may also be exchanged between neighbour nodes when a slot is released or moved. A node may listen to those messages to collect information about slots being released or moved by its neighbour nodes.

Further optionally, as is indicated by claim 6, the registration module is configured to periodically share content of the scheduling table with neighbour nodes. This implies that content of the scheduling table, stored by the registration module, is transmitted to neighbour nodes at specific moments in time. For example, broadcasting may be used to share the scheduling table with neighbour nodes. Typically, the content being shared comprises only the information about the slots used by the node itself. This allows neighbour nodes to acquire knowledge about the use of slots by nodes being one hop away, and to update their scheduling tables accordingly. As the scheduling table is periodically shared, this provides a very robust way for updating the knowledge of neighbour nodes, without the risk of missing information that is only instantly available. This ensures that all nodes in the vicinity have correct slot usage information, enabling to avoid collisions and to have a good view on the slots being actually available.

Optionally, as is indicated by claim 7, the slot usage information is collected based on control messages and based on content of scheduling tables periodically shared by neighbour nodes. This implies that slot usage information is collected in two ways, the first of them being based on the control messages exchanged by neighbour nodes during slot allocation, and the second of them being based on scheduling tables periodically shared by neighbour nodes. The first way to collect slot usage information is event-based, i.e. each time a slot allocation takes place, a node gets informed about this and updates its scheduling table. This allows a node to swiftly update its table, providing it the most actual view on slot usage in its vicinity. However, due to possible mobility of the nodes, a node may have missed specific control messages because it was out of range at the time the control messages were exchanged. Moreover, also in the case of collision of control messages, a node may have missed specific information. The second way to collect slot usage information relies on the scheduling tables that are periodically shared by neighbour nodes. Every time content of a scheduling table is received, a node may update its own scheduling table with any information it was still missing. If a node has missed some information because it was out of range, it will have the chance to collect it a next time, as the tables are shared periodically. Collecting slot usage information relying on an event-based as well as a periodic approach has the advantage that a dynamic as well as a robust way to collect slot usage information is obtained. This allows nodes to have a correct and actual view on slots being available for allocation, even in a setting with mobile nodes. This contributes to solving the hidden as well as the exposed node problem, leading to a reliable medium access control and a full utilization of the available spectrum.

Further optionally, as is indicated by claim 8, a predefined selection of slots is reserved for control, control comprising collecting slot usage information by the information exchange module, and running a slot allocation procedure by the slot allocation module. In a time-shared medium, one or more timeslots within a superframe may be reserved for control. In a time- and frequency shared medium, one or more time-frequency slots within a superframe may be reserved for control. Being reserved for control means that nodes may use these control slots to exchange information related to control. Such information related to control comprises control messages transmitted or received during slot allocation, e.g. to propose slots for allocation or to receive feedback on a selected slot. Exchanging information related to control also refers to the collection of slot usage information. For example, it may refer to listening to control messages exchanged by neighbour nodes during slot allocation or slot release, receiving a scheduling table from a neighbour node, sharing a scheduling table with neighbour nodes, etc.

A predefined selection of control slots is made, where all the nodes participating in the network reserve the same slots for control. This means that in the scheduling table of each node, representative for a superframe, the same cells will be appointed as reserved for control. In an embodiment, control slots in a superframe may be chosen in a way that the distance between control slots is the furthest possible both in time and frequency. In this way, if one control slot is heavily interfered by external networks present in that part of the spectrum, slots in other parts of the spectrum would be able to take over the control load. In another embodiment, control slots may all be chosen in one frequency channel, in order to hold the other channels completely free for data transfer. In an embodiment, the number of control slots may be chosen based on the available radio spectrum and channelization, e.g. at boot time of the network.

The reservation of specific slots for control has the advantage that no full channel needs to be reserved for control, thereby leaving more slots open for data transfer. This contributes to an optimal spectrum utilization and an efficient use of scarce bandwidth resources. Moreover, as nodes are only listening for control within the specific control slots, not continuously, energy consumption is reduced. Furthermore, the use of the same control slots by every node of the network, allows for a concurrent reservation of data slots, where every node can try to do an allocation procedure within the same control slot. Therefore, no inherently sequential reservation procedure is needed, thereby reducing the time needed for reservations and allowing to swiftly react to changes in the network. Finally, the number of control slots can be chosen according to specific requirements of the network or application. This leads to a generic medium access control, applicable for e.g. different network sizes and topologies. In a more advanced embodiment, the number of control slots and its location within the available spectrum may even be chosen dynamically, by monitoring the actual state of the network and its actual requirements.

Optionally, as is indicated by claim 9, the communication within the slots reserved for control makes use of a broadcast protocol. This implies that broadcasting is used e.g. to collect slot usage information or to exchange messages during a slot allocation procedure. Broadcasting refers to the use of a common link by all nodes. For example, within a specific timeslot reserved for control, all nodes transmit and receive on the same channel. In another timeslot reserved for control, another channel may be selected for broadcasting control messages. Broadcasting implies that all signals being exchanged for control can be captured by any other node, provided that they are within each other's range. In order to prevent or reduce collisions between control data packets, a broadcast protocol is needed to manage the access of a node to a common broadcast channel within a timeslot reserved for control. In various embodiments, different broadcast protocols may be used, like e.g. a pure or slotted aloha, polling, CSMA/CA, etc. The use of a broadcast protocol contributes to an efficient and reliable exchange of control information.

Further optionally, as is indicated by claim 10, the device is configured to receive one or more settings of network wide parameters and to configure the registration module and/or information exchange module and/or slot allocation module according to these settings. This implies that the device comprises a component to receive settings, and to share these settings with various modules comprised in the device. Next, the registration module and/or information exchange module and/or slot allocation module are configured according to the received settings. The settings concern values of network wide parameters, e.g. the number or position of control slots, the timeslot duration, the superframe duration, the period for sharing a scheduling table, etc. For example, optimal values for these parameters may be determined during bootstrapping or during operation of the network. By configuring one or more modules based on the received settings, medium access control may be adapted according to network characteristics like its size or topology, or according to actual requirements of the network. This has the advantage that for different networks or applications, an optimal performance is obtained in terms of throughput, reliability and energy use.

Optionally, the network wide parameters comprise at least one of: parameters concerning the slots reserved for control, parameters concerning the scheduling table, parameters concerning the broadcast protocol, parameters concerning the periodic sharing of the scheduling table. Parameters concerning the slots reserved for control are, for example, the number of slots reserved for control, their position within the superframe, etc. Parameters concerning the scheduling table are, for example, the duration of the superframe, the number of timeslots, the number of channels, the timeslot duration, etc. Parameters concerning the broadcast protocol are, for example, the type of broadcast protocol or specific parameters used within a broadcast protocol like e.g. the wait time when a back-off strategy is used. A parameter concerning the periodic sharing of the scheduling table is, for example, the periodicity at which scheduling tables are shared.

According to a second aspect of the present invention, the above identified objectives are realized by a distributed system for medium access control in a wireless communication network with shared medium, defined by claim 12, comprising a device according to the first aspect of the invention for each of the nodes of the communication network. Thus, the second aspect of the invention concerns a system comprising multiple devices, where each device is configured to manage the medium access control of an individual node. Therefore, medium access control is managed in a distributed way. This avoids that control messages concerning slot and/or channel allocation all have to be communicated with a central system, thereby limiting the overhead related to control and leading to an improved performance with regard to throughput, latency and energy consumption. As all control is managed locally, at the level of individual nodes, a node does not need any knowledge regarding its network membership or the network size. This makes the device suitable for large networks, for different network topologies and for networks whose size and/or topology change dynamically. As such, the invention provides a generic and flexible solution.

Optionally, as is indicated by claim 13, the distributed system further comprises a centralized module configured to define optimal settings for network wide parameters and to transmit these settings to the device. Network wide parameters are for example the number of slots reserved for control, their position within a superframe, the superframe duration, the type of broadcast protocol, a wait time in a broadcast protocol, the periodicity at which scheduling tables are shared, etc. A centralized module may monitor the network and, based on what is detected or measured, define optimal values for the network wide parameters. By using these parameters to configure or reconfigure the device, its operation may be optimised according to the actual network conditions. This contributes to an optimal performance of the medium access control in terms of throughput, reliability and energy consumption.

According to a third aspect of the present invention, the above identified objectives are realized by a method for medium access control in a node of a wireless communication network with shared medium, defined by claim 14, comprising:

maintaining the use of slots in a scheduling table, the slots comprising timeslots and/or frequency channels;

collecting slot usage information indicative for the use of slots by neighbour nodes in the range of a node;

updating the scheduling table based on the slot usage information;

allocating a slot for communication with a neighbour node by consulting the scheduling table in a slot allocation procedure with the neighbour node;

updating the scheduling table based on the allocated slot, wherein the scheduling table specifies slots used by neighbour nodes for transmission only, for reception only, and for both transmission and reception.

According to a fourth aspect of the present invention the above identified objectives are realized by a computer program product, defined by claim 15, comprising computer-executable instructions for causing a device to perform at least the following:

maintaining the use of slots in a scheduling table, the slots comprising timeslots and/or frequency channels;

collecting slot usage information indicative for the use of slots by neighbour nodes in the range of a node;

updating the scheduling table based on the slot usage information;

allocating a slot for communication with a neighbour node by consulting the scheduling table in a slot allocation procedure with the neighbour node;

updating the scheduling table based on the allocated slot, wherein the scheduling table specifies slots used by neighbour nodes for transmission only, for reception only, and for both transmission and reception.

BRIEF DESCRIPTION OF THE DRAWINGS

FIG. 4 to FIG. 5b illustrate how the invention allows to solve the hidden node problem. FIG. 4 shows an example of how timeslots are used in time, FIG. 5b shows the corresponding scheduling table.

FIGS. 6 to 14 illustrate how the invention allows to solve the exposed node problem. FIG. 6 shows an example of how timeslots are used in time. FIGS. 7a, 8a, and 9a show the actual state of a network within a particular timeslot, for a first, second and third case respectively. FIG. 10 gives another example of how timeslots are used in time. FIG. 12 gives an example of how frequency channels may be assigned to different users. FIG. 13a show the actual state of a network within a particular timeslot for a fifth case, while FIG. 14a show the actual state of a network within a particular timeslot for a sixth case, while

FIG. 16 gives a schematic representation of a distributed system comprising devices according to the invention and a centralized module.

DETAILED DESCRIPTION OF EMBODIMENT(S)

Figure 1:
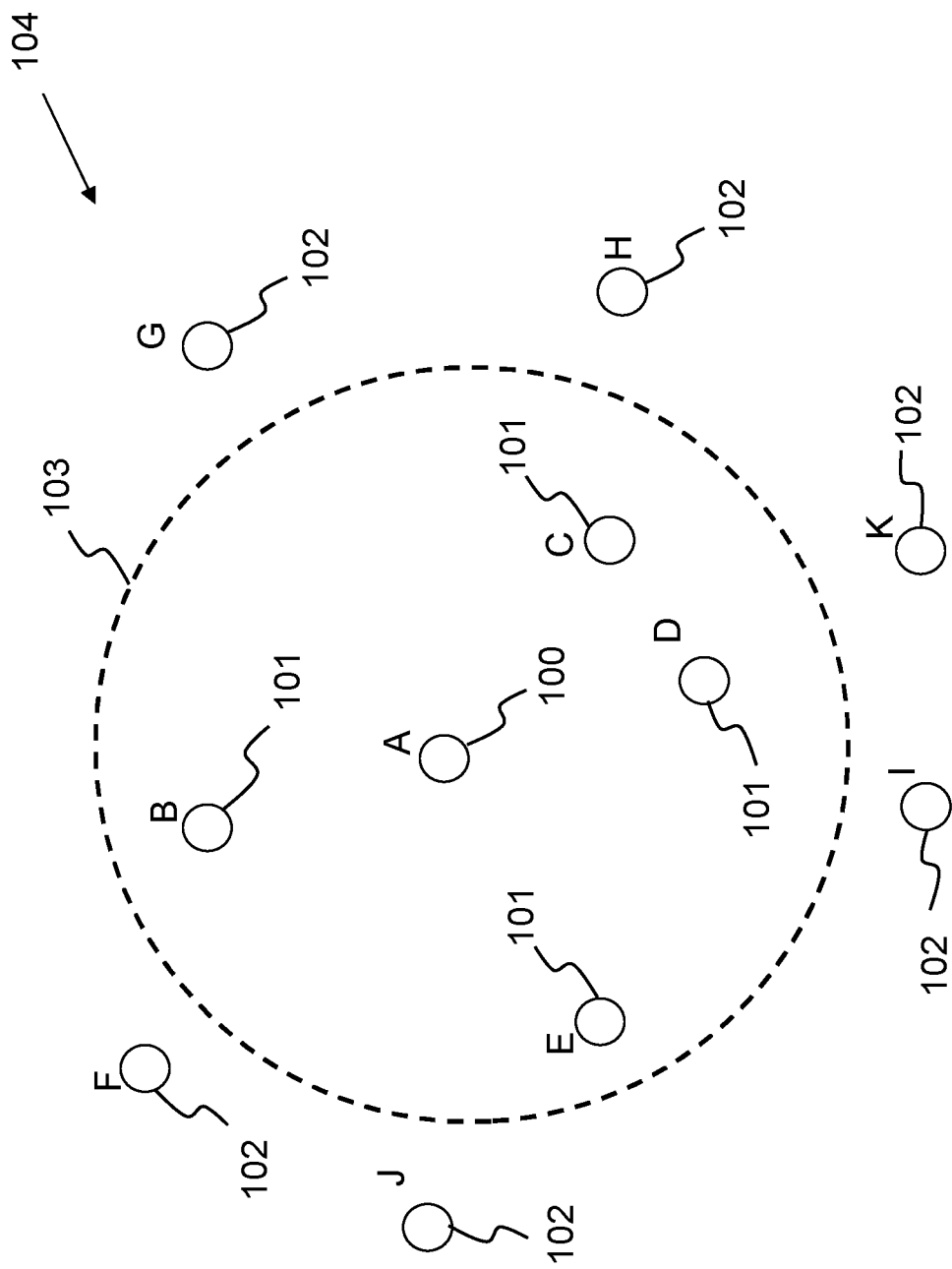
FIG. 1 gives a schematic representation of a wireless communication network.

FIG. 1 gives a schematic representation of a wireless communication network 104, comprising nodes 100, 101 and 102. The node 100, indicated with A, is able to communicate with its neighbour nodes 101, located within the range 103 of node 100. Other nodes 102 are out of the range 103 of the node 100, and therefore cannot communicate directly with node 100. The network 104 may be a wireless network using fixed infrastructure, or an ad hoc wireless network. Optionally, the nodes of the ad hoc network may be mobile. Every node 100, 101, 102 of the wireless communication network 104 has one or more transceivers which may working in full-duplex or half-duplex mode. The wireless communication network 104 makes use of a shared medium, which may be time-shared, frequency-shared, or both time- and frequency-shared. The medium may refer to a licensed spectrum, like e.g. the licensed 4G/LTE frequency bands, an unlicensed spectrum, like e.g. Wi-Fi, or a combination of a licensed and unlicensed spectrum.

Figure 2:
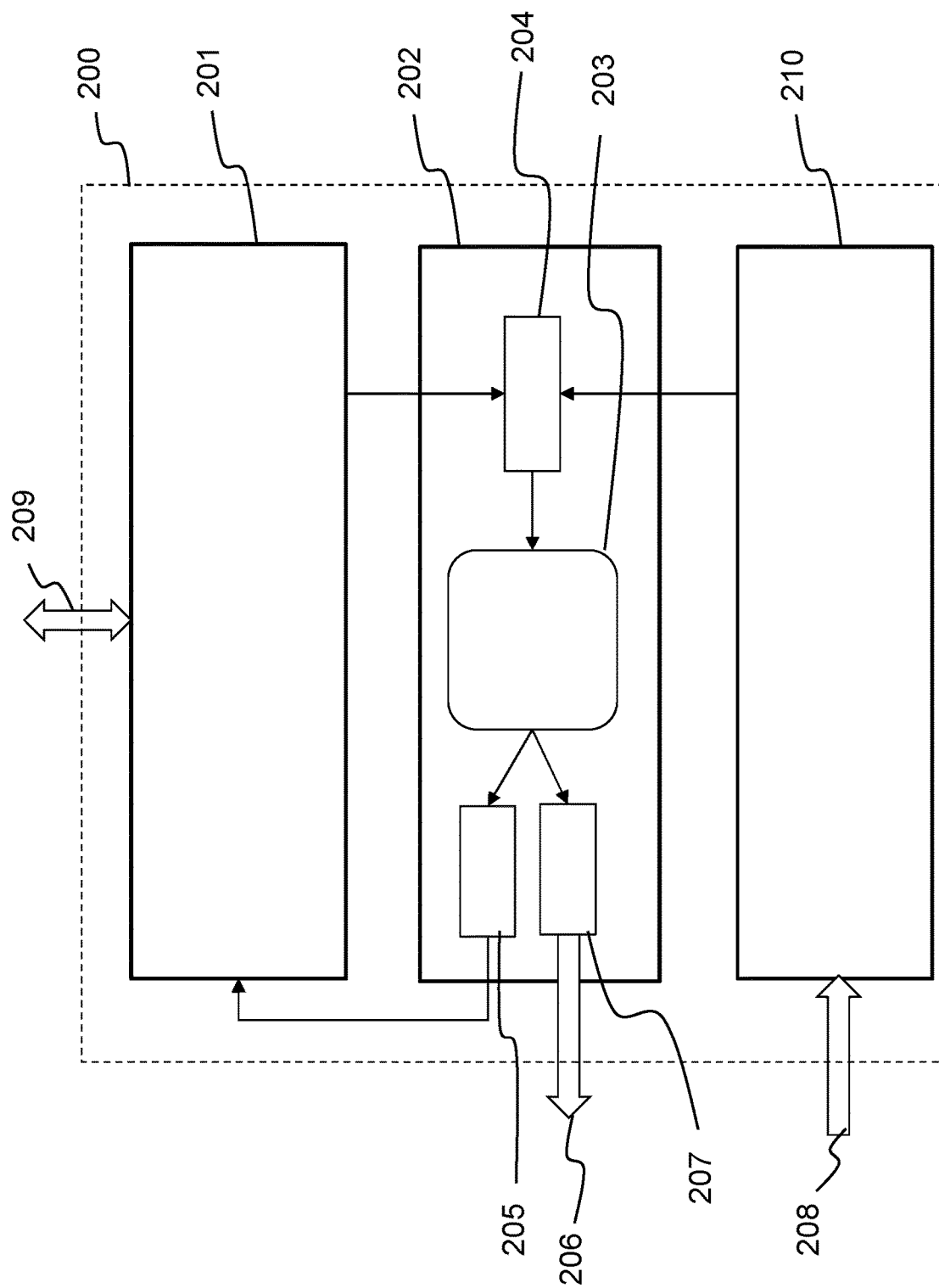
FIG. 2 gives a block diagram of a device according to an embodiment of the invention.
Figure 3:
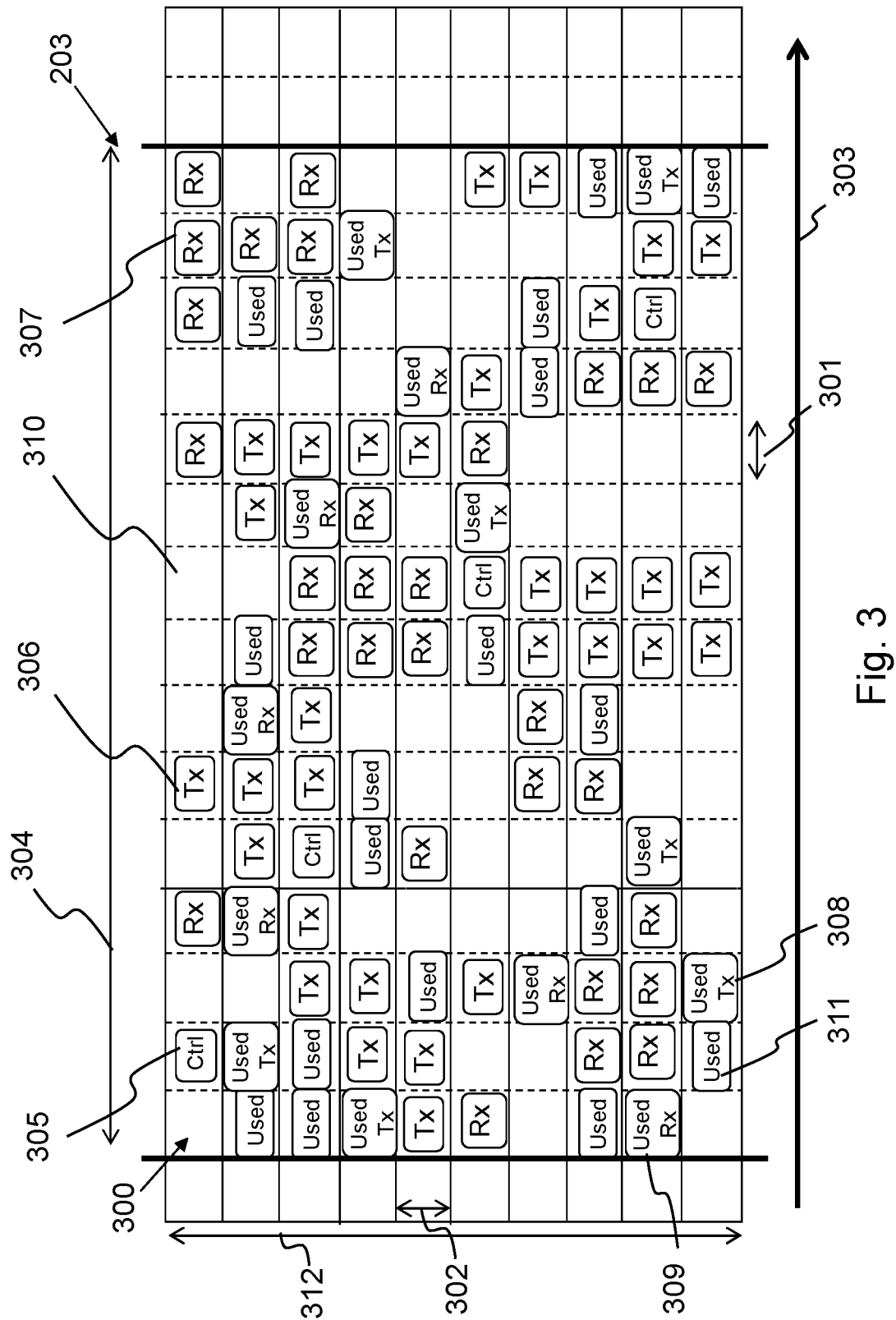
FIG. 3 shows a scheduling table, in an example embodiment of the invention.

Medium access of a node 100, 101, 102 to the shared medium is managed by a device 200, which is schematically presented in FIG. 2. Every node 100, 101, 102 of the network 104 has its own device 200, such that medium access control is managed in a distributed way. The device 200 comprises a registration module 202, an information exchange module 210 and a slot allocation module 201. The registration module 202 is configured to maintain a scheduling table 203, in which information about the use of slots 300 is stored. In FIG. 3 an example of a scheduling table 203 is shown, comprising information about the use of time-frequency slots 300. The information exchange module 210 is configured to collect slot usage information 208 indicative for the use of slots 300 by neighbour nodes 101. Based on the collected slot usage information 208, the scheduling table 203 is updated by means of an editing component 204. The slot allocation module 201 is configured to allocate a slot 300 for communication with a neighbour node 101 by executing a slot allocation procedure in which information is exchanged with the neighbour node, see 209 in FIG. 2. During a slot allocation procedure, a node 100 consults its said scheduling table 203 making use of a reading component 205. In an embodiment, the slot allocation module 201 may also be configured to release an allocated slot and/or to move an allocated slot to a new position in the scheduling table 203. After allocation and/or release and/or move of a slot, the scheduling table 203 is updated, using the editing component 204. In the embodiment of FIG. 2, the registration module further comprises a sharing component 206, configured to share content of the scheduling table 203 with neighbour nodes 101.

In FIG. 3 an example of a scheduling table 203 is shown, as it may be used in a multi-frequency TDMA scheme according to an embodiment of the invention. The scheduling table 203 represents a superframe with superframe length 304 on a time axis 303, and superframe width 312 representative for the available spectrum bandwidth. The superframe length 304 is divided in multiple timeslots 301, and the superframe width 312 is divided in multiple frequency channels 302. Therefore, each cell of the scheduling table 203 represents a time-frequency slot 300. Each time-frequency slot 300 may be assigned to a different user in the network 104. During operation, the superframe with duration 304 is cyclically repeated in time, allowing different users do their specific communication in rapid succession, one after the other, each of them using their own slot 300. In the embodiment of FIG. 3, the available spectrum bandwidth is divided in a number of frequency channels 302. The scheduling table 203 stores information about the use of each frequency channel 302 within a specific timeslot 301. As such, every cell of the scheduling table 203 is configured to store information about the use of a specific time-frequency slot 300.

The embodiment shown in FIG. 3 refers to a multi-frequency TDMA scheme. In other embodiments, the scheduling table 203 may be one-dimensional. For example, in a one-channel TDMA scheme only information about the use of timeslots 301 may be stored in a scheduling table 203. In yet another embodiment, the scheduling table 203 may only store information about the assignment of frequency channels 302, without considering different timeslots 301. The latter may e.g. be the case for an FDMA (Frequency Division Multiple Access) scheme.

In the embodiment of FIG. 3, a cell of the scheduling table 203 maintained by node 100 may contain the following types of information:
  Tx: A slot 306 being marked as 'Tx' refers to a slot 300 that has been allocated by node 100 for transmission, i.e. the slot 306 is used for transmission from node 100 to a neighbour node 101.

Rx: A slot 307 marked as 'Rx' refers to a slot 300 that has been allocated by node 100 for reception, i.e. the slot 307 is used for transmission from a neighbour node 101 to node 100.

Used: A slot 311 marked as 'Used' refers to a slot 300 that has been allocated by a neighbour node 101 for transmission and has been allocated by a neighbour node 101 for reception. For example, two neighbour nodes 101 are using the slot 311 to communicate with each other. In another example, a first neighbour node 101 receives from a transmitter 102 out of range of node 100, and a second neighbour node 101 transmits to a receiver 102 out of range of node 100, where both the first and second neighbour node 101 are not in vicinity of each other.

Used Tx: A slot 308 marked as 'Used Tx' refers to a slot 300 that has been allocated by a neighbour node 101 for transmission, but none of the neighbour nodes 101 has allocated it for reception.

Used Rx: A slot 309 marked as 'Used Rx' refers to a slot 300 that has been allocated by a neighbour node 101 for reception, but none of the neighbour nodes 101 has allocated it for transmission.

Ctrl: A slot 305 marked as 'Ctrl' refers to a slot 300 that is reserved for control.

Empty: Slots 310 not containing any information in FIG. 3 are considered as empty slots, i.e. they have not been allocated by the node 100 itself or by any of the neighbour nodes 101.

When a node 100 wants to start a new data communication, it will consult its scheduling table 203 to get a view on the currently available slots 300. Slots 306, 307 being marked as 'Tx' or 'Rx' are used by the node 100 itself, and therefore are not available for a new data communication. Also slots 311, marked as 'Used', are not available. Slots 305 are reserved for control, and neither are available for data communication. Taking into account the information about slots being unavailable for a new allocation allows to avoid internal interferences in the wireless network and to avoid the hidden node problem. The latter will be further illustrated in FIGS. 4 and 5.

Empty slots 310 are not in use by the node 100 or any of the neighbour nodes 101, and therefore are available for a new data communication by node 100. Slots 308 marked as 'Used Tx' have been allocated by a neighbour node 101 for transmission, but none of the neighbour nodes 101 has allocated it for reception. This implies that the receiver for this specific communication is out of the range 103 of node 100. As this receiver is not able to receive what is transmitted by node 100, such a slot 308 is available for transmission from node 100. Slots 309 marked as 'Used Rx' have been allocated by a neighbour node 101 for reception, but none of the neighbour nodes 101 has allocated it for transmission. This implies that the transmitter for this specific communication is out of the range 103 of node 100. Therefore, such a slot 309 is available for reception by node 100. Keeping the 'Used Tx' and 'Used Rx' information in the scheduling table 203 allows to solve the exposed node problem, as will further by illustrated by the cases presented in FIGS. 6 to 14.

Figure 4:
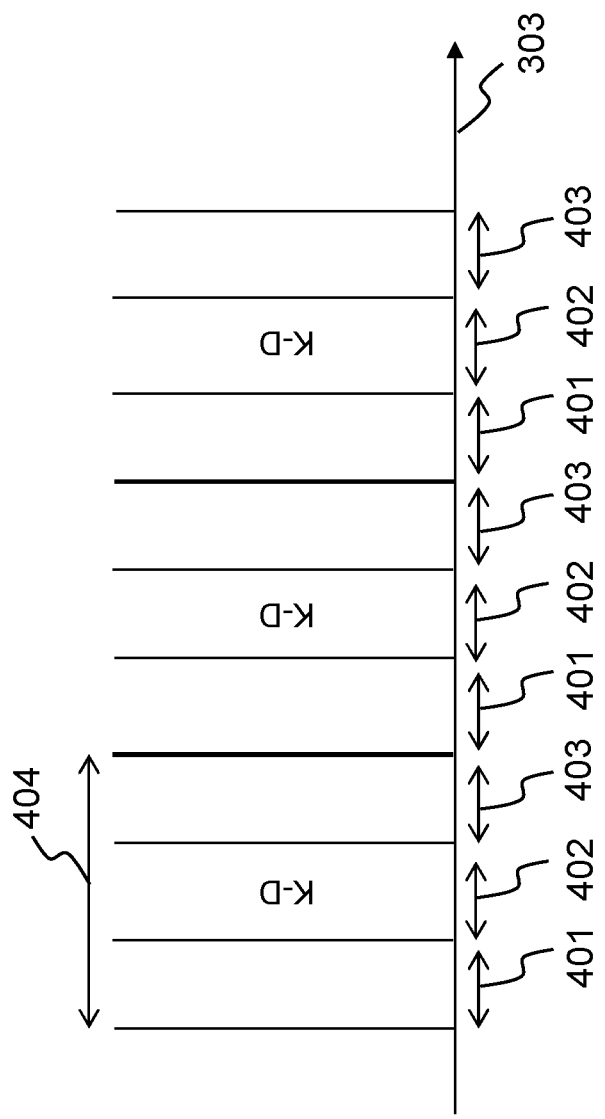
Figure 5A:
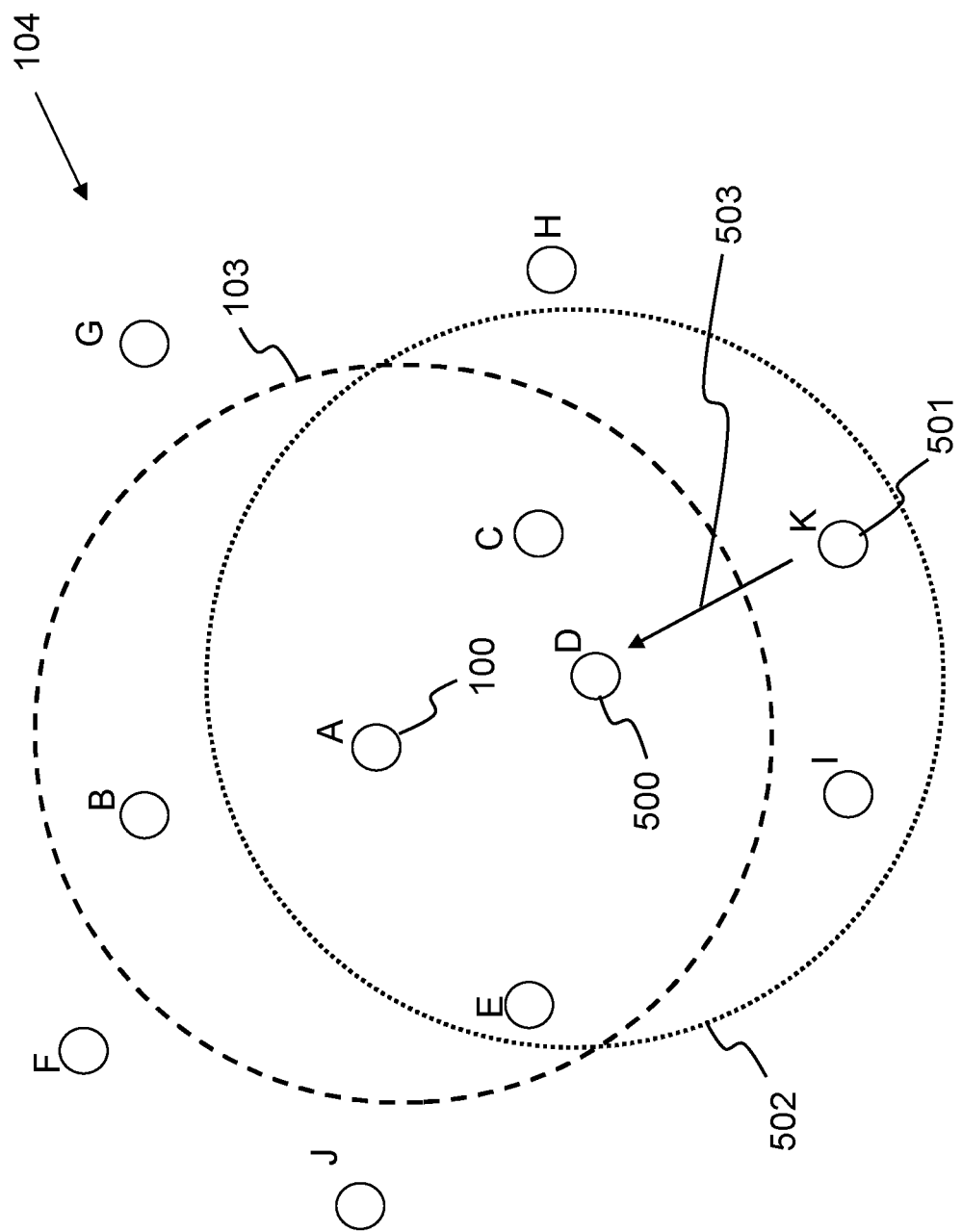
FIG. 5a shows the actual state of a network within a particular timeslot.
Figure 5B:
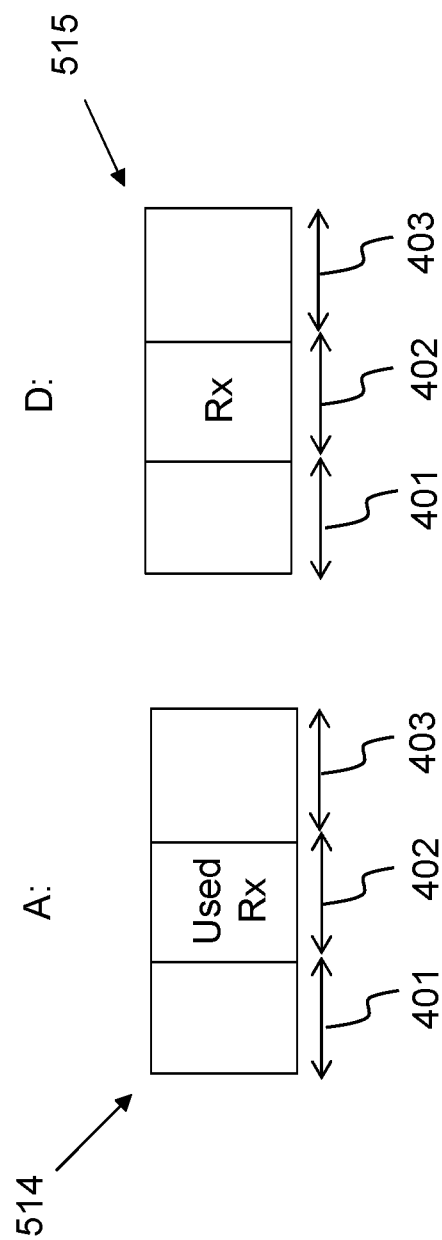

FIGS. 4, 5a and 5b illustrate how the invention allows to solve the hidden node problem. An example with a one channel TDMA scheme is given to illustrate the concept, but the same concept applies as well in a multi-frequency TDMA scheme or an FDMA scheme. FIG. 4 illustrates a superframe length 404 comprising three timeslots 401, 402 and 403. For the sake of clarity, only three timeslots are considered in this example. In other embodiments however, another number of slots may be comprised in a superframe. FIG. 4 shows that timeslot 402 is currently allocated for transmission from a node K to a node D, while the other timeslots 401 and 403 are still free. FIG. 5a shows the state of a network 104 at a moment in time within the timeslot 402. A node 100, indicated as 'A' has a range 103, while a node 500, indicated as 'D' has a range 502. The node D, 500, is located within the range 103. The node K, 501, is located within the range 502 but not within the range 103. In correspondence with FIG. 4, the transmission 503 from K to D is shown in FIG. 5a. FIG. 5b gives the corresponding scheduling tables 514 and 515, respectively maintained by the device 200 of node A and node D. A one-dimensional scheduling table 514, 515 is shown, representing the use of the timeslots 401, 402 and 403.

In the scheduling table 514 of node A, the timeslot 402 is marked as 'Used Rx', as neighbour node D is using this timeslot 402 for reception. In the scheduling table 515 of node D, the timeslot 402 is marked as 'Rx', as node D is using this timeslot for the reception from node K. If node A, 100, wants to start transmission to node D, 500, consultation of its scheduling table 514 shows that the timeslot 402 cannot be proposed, as it is marked as 'Used Rx'. Therefore, it is avoided that both nodes K, 501, and A, 100, would be transmitting to node D, 500, at the same time, although nodes K and A are not aware of each other's presence. Therefore, the hidden node problem is avoided.

Figure 6:
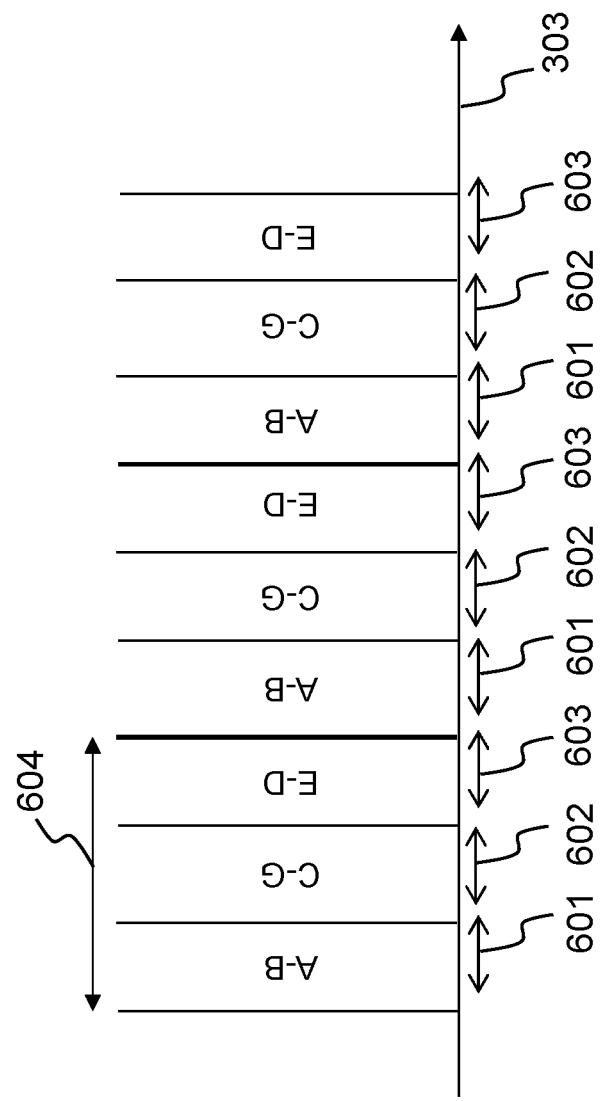

FIGS. 6 to 14 illustrate how the invention allows to solve the exposed node problem, for six different cases. FIG. 6 illustrates a superframe length 604 comprising three timeslots 601, 602 and 603, in a one-channel TDMA scheme. For the sake of clarity, only three timeslots are considered in this example. In other embodiments however, another number of slots may be comprised in a superframe. FIG. 6 shows that timeslot 601 is allocated for transmission from a node A to a node B, timeslot 602 is allocated for transmission from a node C to a node G, and timeslot 603 is allocated for transmission from a node E to a node D. In correspondence with FIG. 6, the figures FIGS. 7a, 8a and 9a show the state of a network 104 at a moment in time within the timeslot 602, for a first, a second and a third case. Accordingly, FIGS. 7b, 8b and 9b give scheduling tables for the first, second and third case respectively. The transmission 703, 803, 903 from node C, to node G, taking place within the timeslot 602, is shown in FIGS. 7a, 8a and 9a.

Figure 7A:
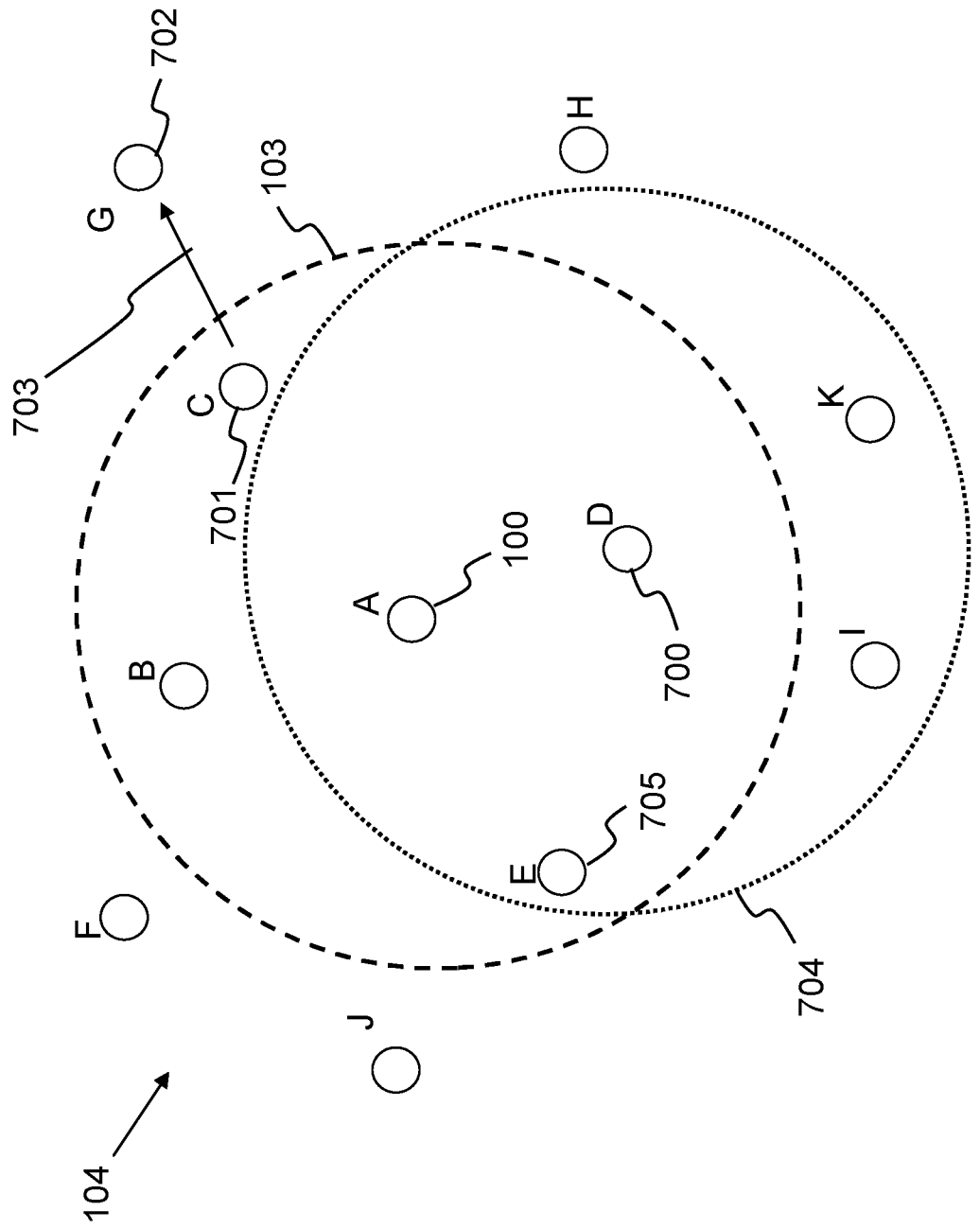
Figure 7B:
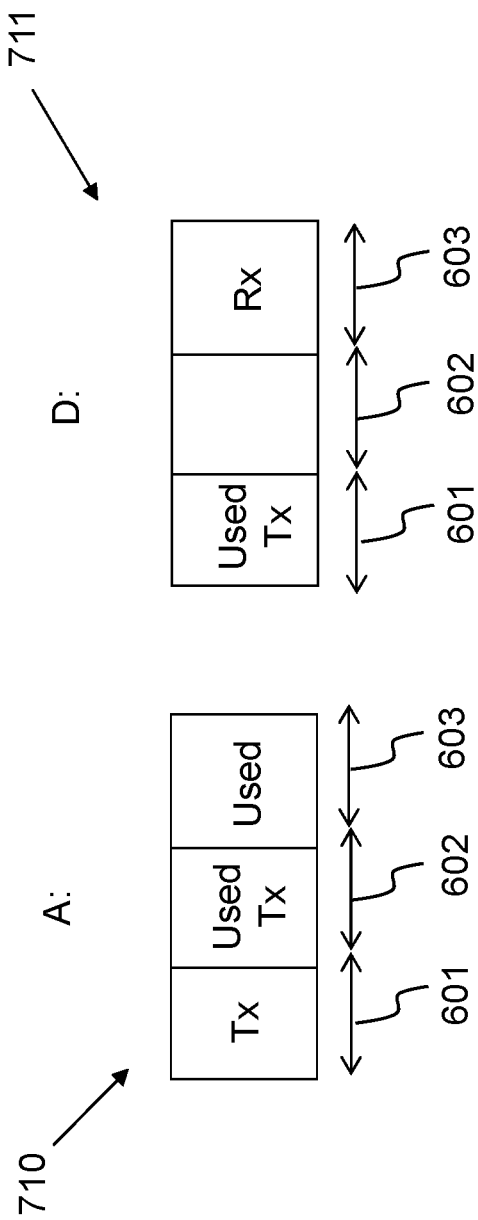
FIGS. 7b, 8b, and 9b show the corresponding scheduling tables, in the first, second and third case respectively.

In the situation of FIG. 7a, node C, 701, is located within the range 103 of node A, 100, but is located outside of the range 704 of node D, 700. Node G, 702, is located outside of both ranges 103 and 704. FIG. 7b gives the scheduling table 710 maintained by the device 200 of node A. In the table 710, the timeslot 601 is marked as 'Tx' as this timeslot 601 is allocated for transmission from a node A to a node B, as is clear from FIG. 6. In the table 710, the timeslot 602 is marked as 'Used Tx', as this timeslot 602 is used for the transmission from C to G, where only node C, 701, is a neighbour of node A, 100. As node G, 702 is not a neighbour of node A, 100, none of the slot usage information collected by node A from its neighbours will indicate a use of this timeslot 602 for reception. In the table 710, the timeslot 603 is marked as 'Used', as this timeslot 603 is allocated for transmission from node E, 705, to node D 700 and both the nodes E and D are neighbours of node A. FIG. 7b also gives the scheduling table 711 maintained by the device 200 of node D. In the table 711, the timeslot 601 is marked as 'Used Tx' as this timeslot 601 is allocated for transmission from A to B and B is outside the range 704 of node D. In the table 711, the timeslot 602 is empty, as this timeslot 602 is used for the transmission from C to G, were both C and G are outside of the range 704 of node D. In the table 711, the timeslot 603 is marked as 'Rx', as node D is using this timeslot 603 for reception from node E If node A, 100, wants to start transmission to node D, 700, in the case of FIGS. 7a and 7b, it is clear from its scheduling table 710 that timeslot 601, marked as 'Tx', and timeslot 603, marked as 'Used', are not available. However, the timeslot 602 is marked in the scheduling table 710 as 'Used Tx'. Therefore, the timeslot 602 is available for transmission from node A, and can be proposed by node A to node D. Table 711 shows that timeslot 602 is still free for node D, and therefore can be accepted by node D for reception from A. Referring to FIG. 7a, this implies that both the transmission 703 from C to G, and the new transmission from A to D will take place within the same timeslot 602. This is allowed, since node G is not able to hear what is transmitted by node A and no interferences will occur between both communications. As the invention allows to allocate the timeslot 602 for the transmission from A to D, a better use of the available spectrum is obtained than when the slot 602 would be considered as forbidden. Indeed, in the latter case, none of the timeslots 601, 602, 603 would be available for the transmission from A, and the transmission from A to D would have to be delayed. Conversely, the invention avoids the exposed node problem, resulting in a reduced latency and an improved throughput.

Figure 8A:
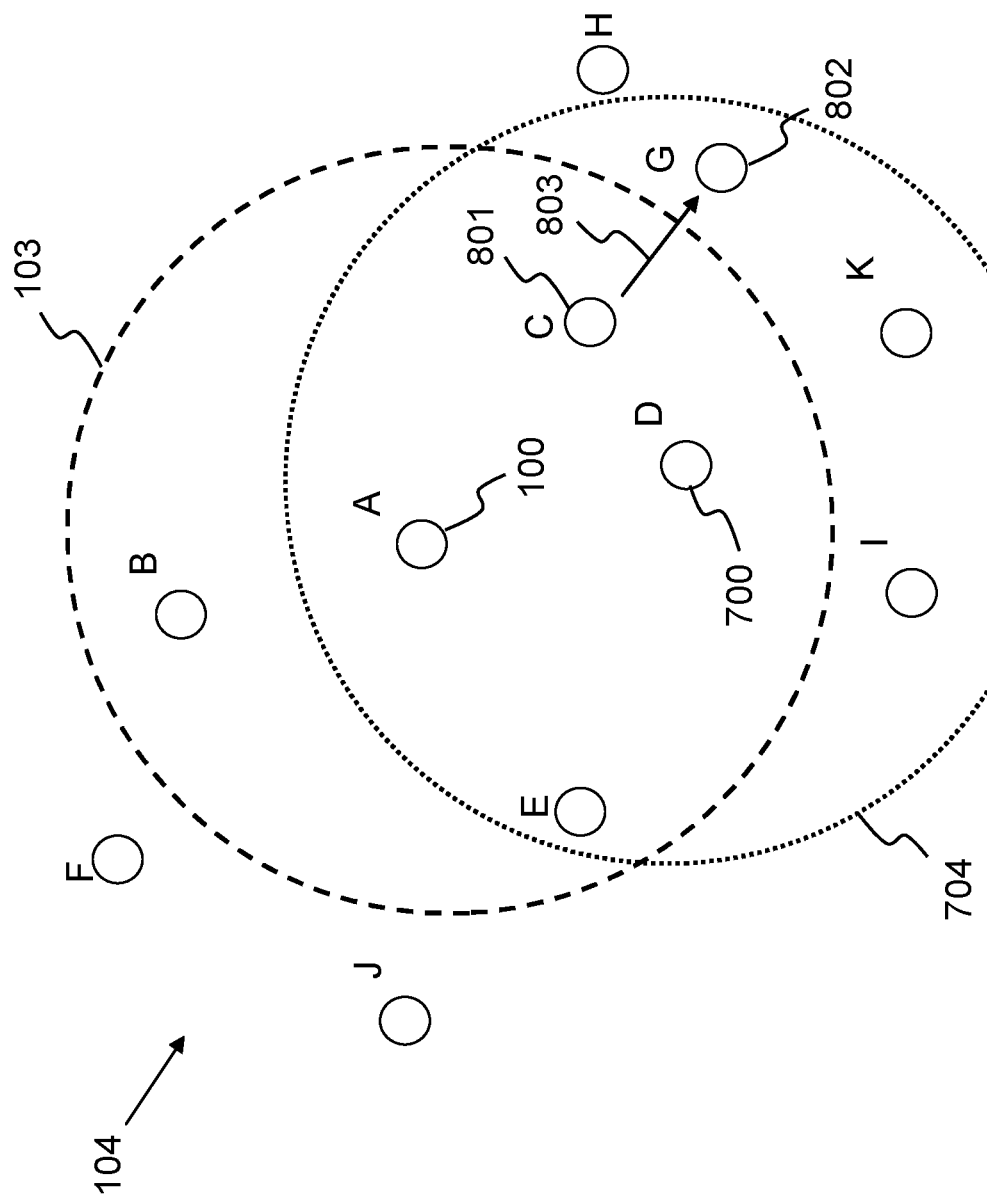
Figure 8B:
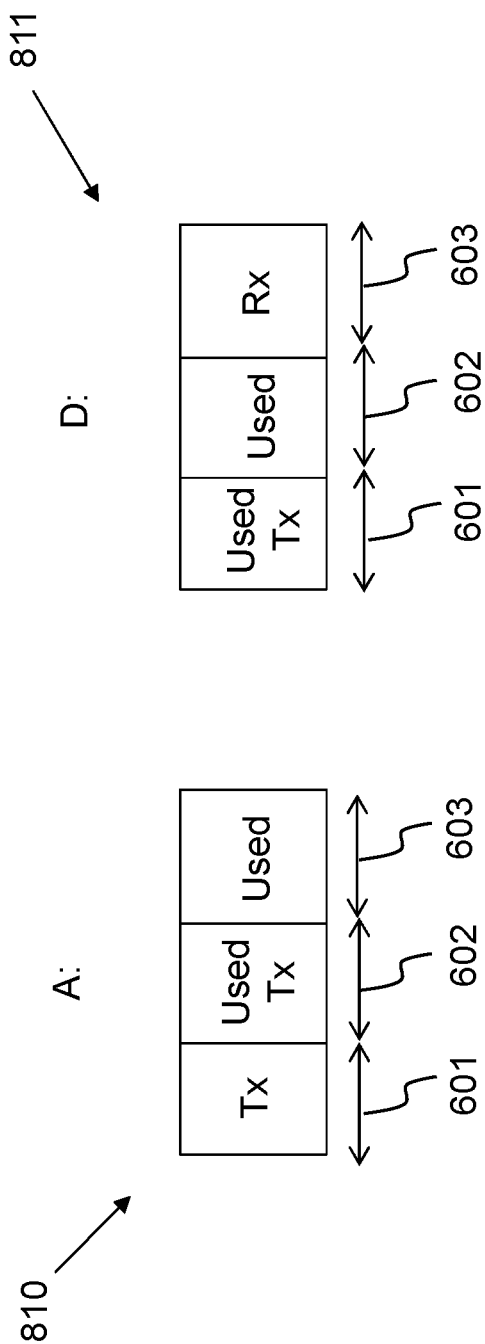

In FIGS. 8a and 8b a second case is considered. The timeslot usage as indicated in FIG. 6 still applies. FIG. 8a shows that the position of the nodes C and G has changed compared to FIG. 7a. Node C, 801, is located within the range 103 of node A, 100, and within the range 704 of node D, 700. Node G, 802, is located within the range 704 of node D, 700, but outside of the range 103 of node A, 100. The corresponding scheduling tables 810, 811 of node A and D respectively are given in FIG. 8b. In this case, if node A wants to start transmission to node D, it will propose the timeslot 602. Indeed, just as in the first case this timeslot 602 is marked as 'Used Tx' in the scheduling table 810 of node A. However, in the case of FIG. 8b, timeslot 602 is marked as 'Used' in the table 811 of node D. Therefore, D cannot accept the timeslot 602 for reception. It is clear from FIG. 8a that indeed transmissions from A and C at same timeslot would interfere at the node D.

Figure 9B:
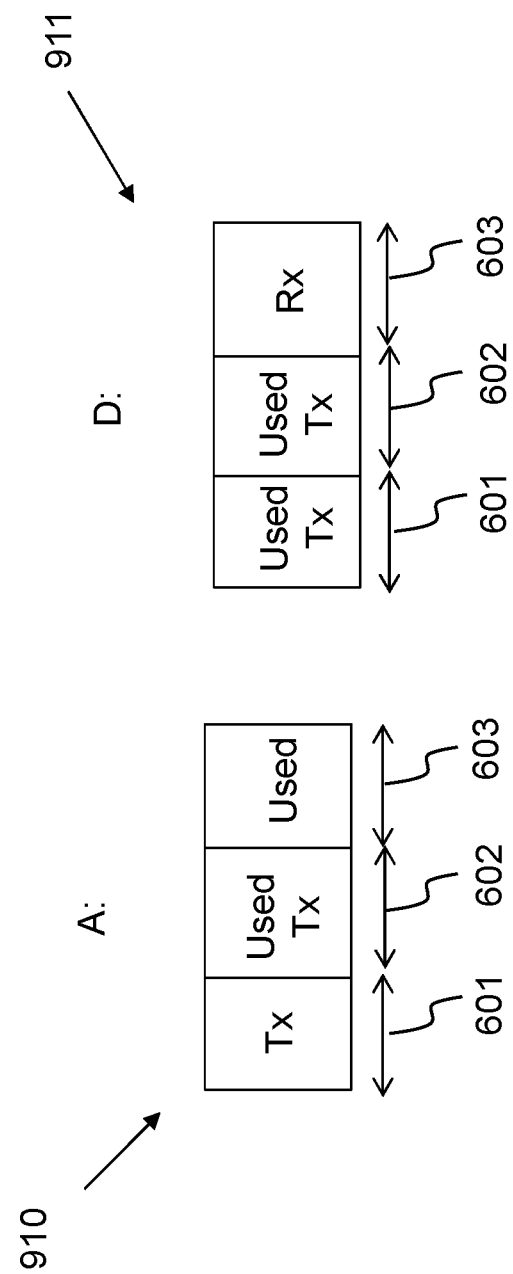

In FIGS. 9a and 9b a third case is considered. The timeslot usage as indicated in FIG. 6 still applies. FIG. 9a shows that the position of the nodes C and G has changed compared to the previous two cases. Node C, 901, is located within the range 103 of node A, 100, and within the range 704 of node D, 700. Node G, 902, is located outside of the range 704 of node D, 700, and outside of the range 103 of node A, 100. The corresponding scheduling tables 910, 911 of node A and D respectively are given in FIG. 9b. In this case, if node A wants to start transmission to node D, it will propose the timeslot 602. Indeed, just as in the first and second case this timeslot 602 is marked as 'Used Tx' in the scheduling table 910 of node A. However, in the case of FIG. 9, timeslot 602 is marked as 'Used Tx' in the table 911 of node D. Therefore, D cannot accept the timeslot 602 for reception. It is clear from FIG. 9a that indeed transmission from A to D would lead to interferences with the transmission from C to G.

The three cases presented in FIGS. 7a to 9b illustrate that on the one hand the exposed node problem is avoided, and on the other hand in function of changing positions of the nodes, the allocated slots may dynamically be updated in order to always avoid internal interferences. Indeed, if for example in the situation of FIG. 7a the slot 602 is being allocated for transmission from A to D, and due to moving nodes the situation changes to the one of FIG. 8a, then internal interferences will be detected, e.g. by measuring a high packet error rate within this slot 602. Accordingly, the transmission from A to D may be moved to another slot.

Figure 10:
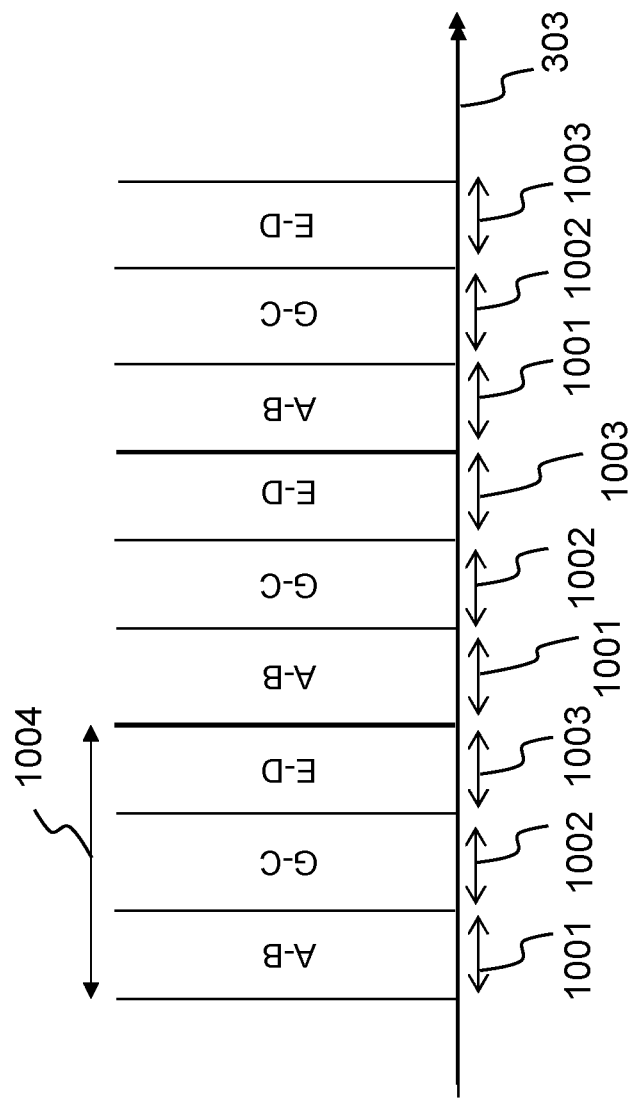
Figure 11A:
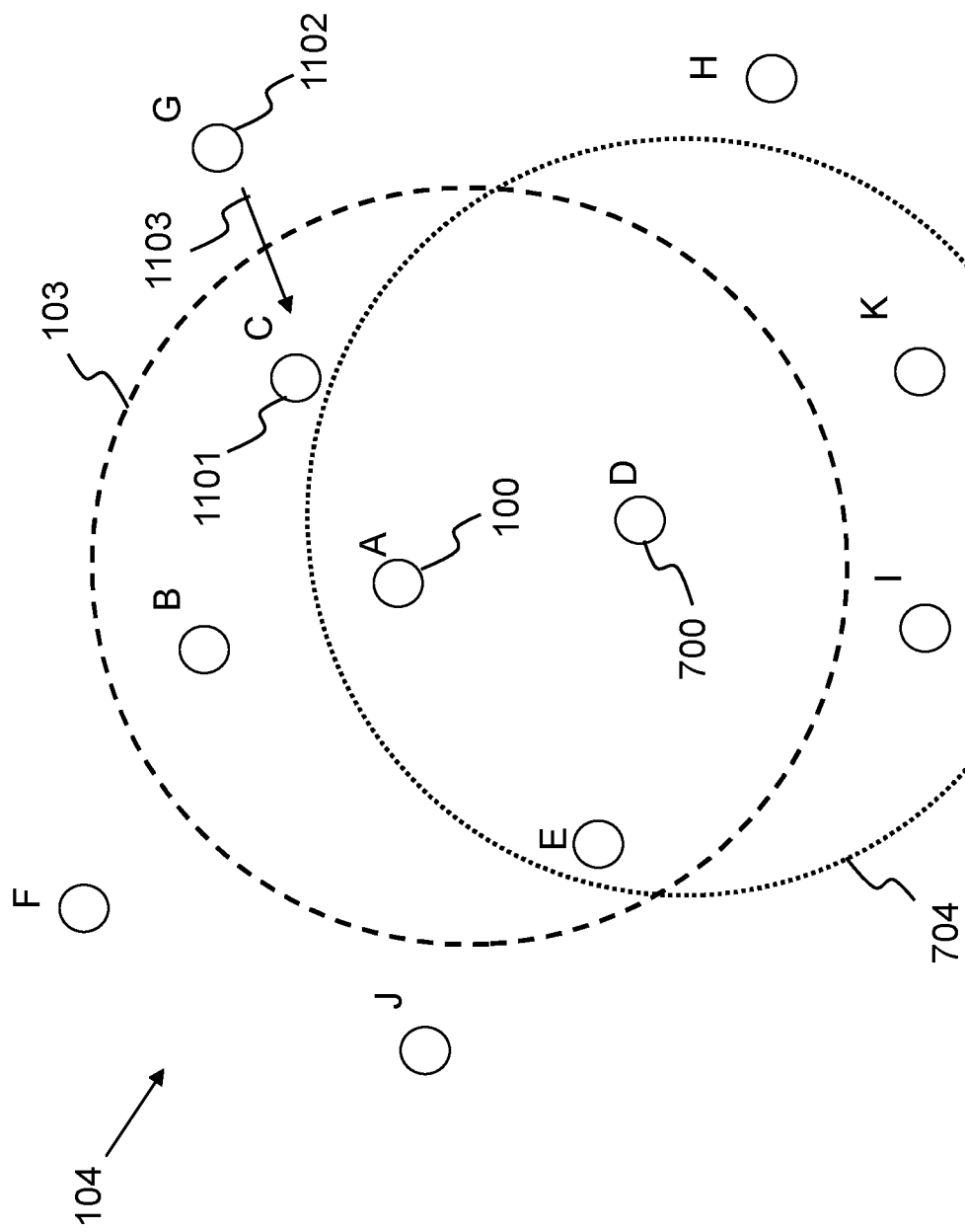
FIGS. 11a and 11b show, for a fourth case, the actual state of a network within a particular timeslot and the corresponding scheduling table respectively.
Figure 11B:
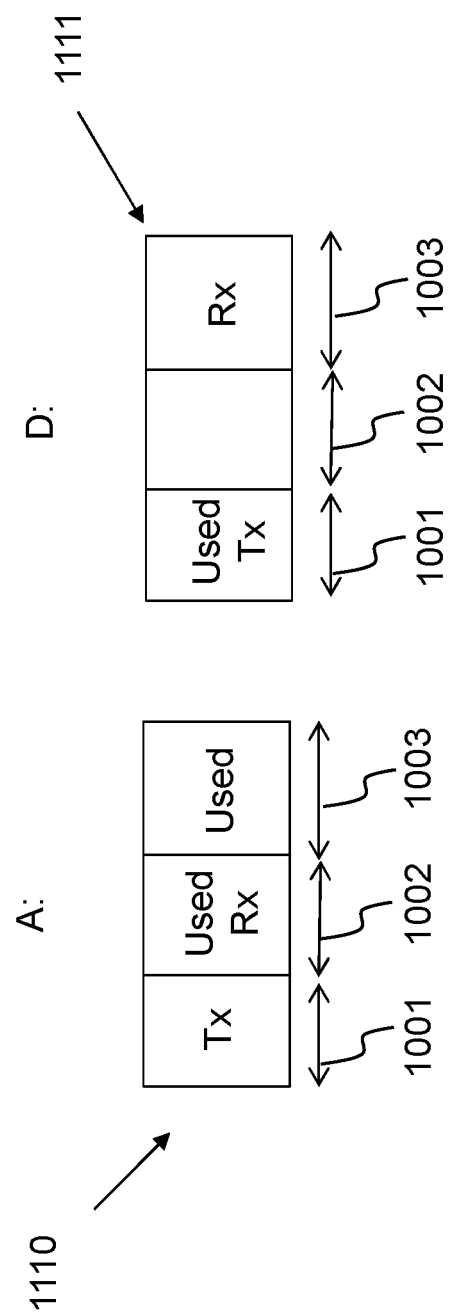

In FIGS. 10, 11a and 11b a fourth case is presented, that illustrates how a slot may be considered available for reception, in order to avoid the exposed node problem. FIG. 10 shows a superframe length 1004 comprising three timeslots 1001, 1002 and 1003. For the sake of clarity, only three timeslots are considered in this example. In other embodiments however, another number of slots may be comprised in a superframe. FIG. 10 shows that timeslot 1001 is allocated for transmission from a node A to a node B, timeslot 1002 is allocated for transmission from a node G to a node C, and timeslot 1003 is allocated for transmission from a node E to a node D.

FIG. 11a shows the state of a network 104 at a moment in time within the timeslot 1002. In this figure, the transmission 1103 from node G, 1102 to node C, 1101, taking place within the timeslot 602, is indicated. Node C, 1101 is located within the range 103 of node A, 100, but outside the range 704 of node D, 700. Node G, 1102 is located outside the range 103 of node A, 100, and outside the range 704 of node D, 700. The corresponding scheduling tables 1110, 1111 of node A and D respectively are given in FIG. 11b. In this case, if node D wants to start transmission to A, it may propose the timeslot 1001, marked as 'Used Tx' in its scheduling table 1111, and/or the timeslot 1002, being empty in its scheduling table 1111. Timeslot 1001 cannot be accepted by node A, since A is already transmitting to B within this timeslot 1001, and collisions would occur at node A. Indeed, D to A transmissions and self-reception of A to B transmissions would interfere within timeslot 1001 at the receiver of node A. Timeslot 1002 can be accepted by node A, as it is marked within its scheduling table 1110 as 'Used Rx'. Indeed, reception at node A from node D does not interfere with the transmission from G to C within timeslot 1002, as node C is not able to hear what is transmitted by node D. This case illustrates that keeping the 'Used Rx' information within a scheduling table gives the advantage that more slots can be considered as available than when a slot like 1002 would be considered as forbidden. As such, the exposed node problem is avoided, resulting in a better utilization of the available spectrum and an improved throughput.

Figure 12:
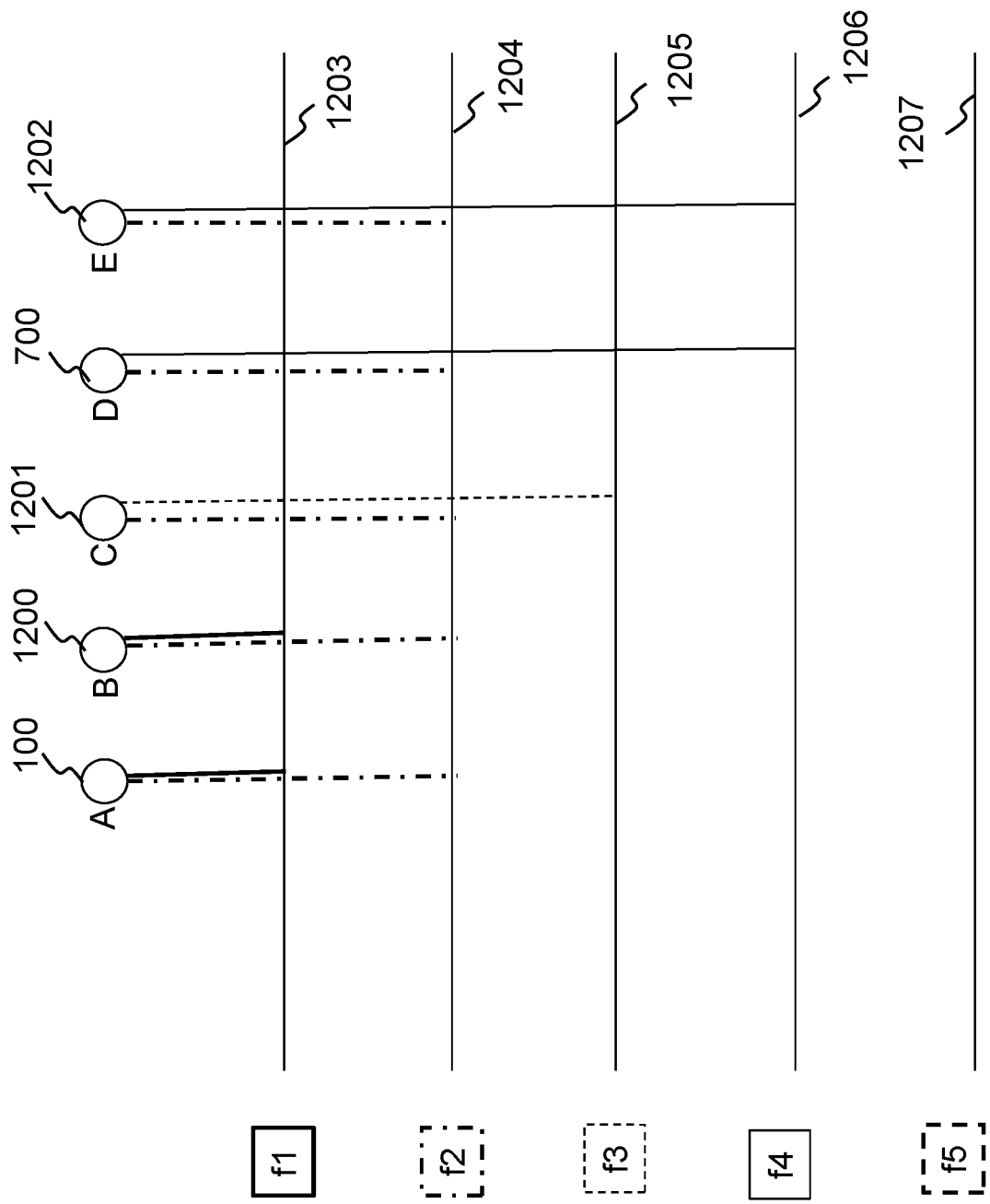
Figure 13A:
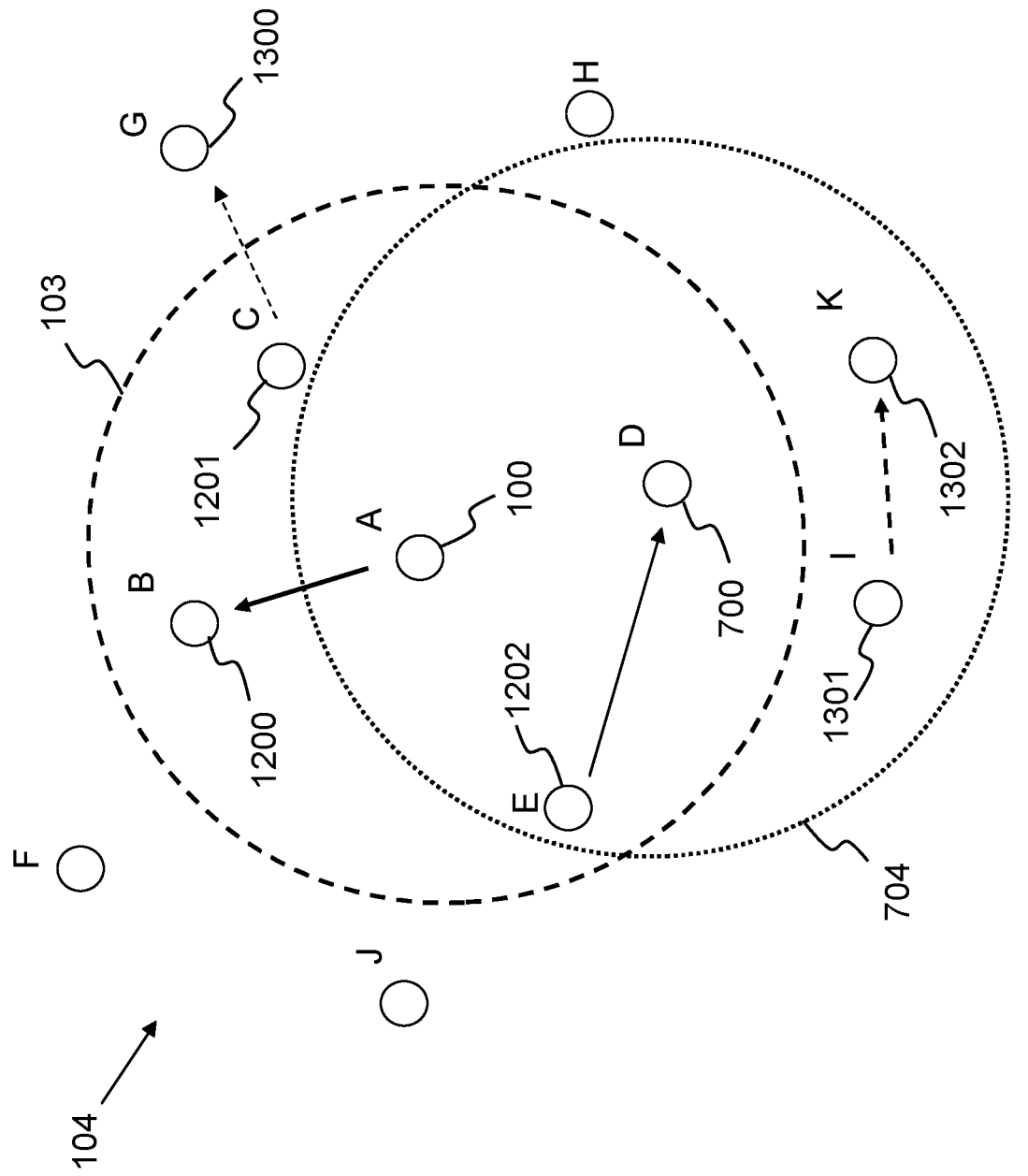

FIG. 12, together with FIGS. 13a to 14b respectively, illustrates a fifth and a sixth case. Here, an example of a multi-frequency TDMA scheme is given. FIG. 12 shows that five frequency channels, 1203, 1204, 1205, 1206 and 1207 are available. For the sake of clarity, only five frequency channels are considered. In other embodiments, another amount of channels may be available. FIG. 12 illustrates schematically how these frequency channels are used by a node A and its neighbors B, C, D, and E, at a specific moment in time within a timeslot 1300. Channel 1203 is used for communication between node A, 100, and node B, 1200, channel 1205 is used for transmission from node C, 1201, channel 1206 is used for communication between node D, 700, and node E, 1202. Channel 1204 is used for control in the considered timeslot, where broadcasting is used to send control signals on this channel 1204. Therefore, in FIG. 12, all nodes are connected to this channel 1204. Channel 1207 is not used by any of the neighbor nodes of node A. In correspondence with FIG. 12, FIG. 13a shows the state of a network 104 at the same moment in time, within timeslot 1300. The figure shows that at this moment in time, node A communicates with node B on channel 1203, and node E communicates with node D on channel 1206. Furthermore, node C communicates with a node G, 1300, where the latter is out of the range 103 of node A. Finally, node I, 1301, communicates with node K, 1302, at channel 1207, where both I and K are out of the range 103 of node A, but within the range 704 of node D. Remark that for clearness of presentation, transmissions on the control channel 1204 are not shown in FIG. 13*a*.

Figure 13B:
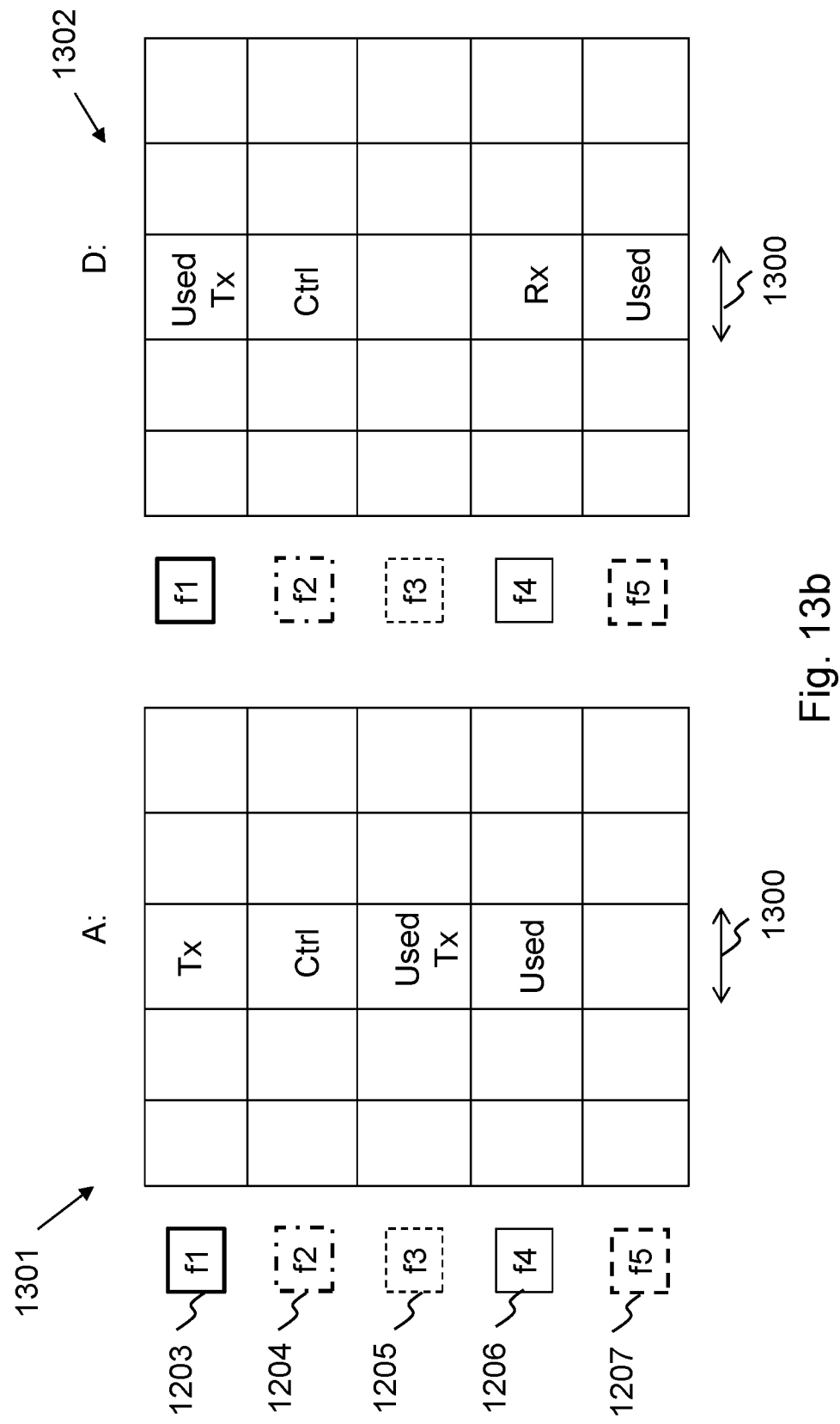
FIG. 13b shows the corresponding scheduling table.

FIG. 13*b* shows the corresponding scheduling tables 1301 and 1302 maintained by the devices 200 of node A and D respectively. For the sake of clarity, only five timeslots are shown in the tables 1301 and 1302, and only the information kept in the tables for timeslot 1300 is shown in the figure. Considering the table 1301 of node A, the slot referring to channel 1203 and timeslot 1300 is marked as 'Tx', as it is used for the transmission from A to B. The slot referring to channel 1205 and timeslot 1300 is marked as 'Used Tx', as it is used for transmission by neighbour node C, but the receiving node G is not a neighbour of A. The slot referring to channel 1206 and timeslot 1300 is marked as 'Used', as it is used for transmission by neighbour node E to neighbour node D. Considering the table 1302 of node D, the slot referring to channel 1203 and timeslot 1300 is marked as 'Used Tx', as it is used for transmission by neighbour node A, but the receiving node B is not a neighbour of D. The slot referring to channel 1206 and timeslot 1300 is marked as 'Rx', as it is used for reception at node D. The slot referring to channel 1207 and timeslot 1300 is marked as 'Used', as it is used for transmission by neighbour node I to neighbour node K.

If node A wants to start transmission to node D, it will consult its scheduling table 1301. Considering timeslot 1300, and assuming that all other timeslots are fully occupied, node A may propose the frequency channels 1207 (empty) and 1205 (Used Tx). Node D cannot accept channel 1207, as it is marked as 'Used' within its scheduling table 1302. Node D can accept channel 1205 however, as it is free in its scheduling table 1302. This is allowed, as node G, which is also receiving at channel 1205, is not able to hear what is transmitted by node A. Therefore, channel 1205 can be allocated for transmission between A and D in timeslot 1300. This would not have been the case if node A was only allowed to propose its empty slots. Consequently, the exposed node problem is avoided, and a larger use of the available spectrum is obtained. Remark that the same concept applies, if all the time-frequency slots in the scheduling tables 1301 and 1302 are considered. In that case, available slots can be selected from the complete table.

Figure 14B:
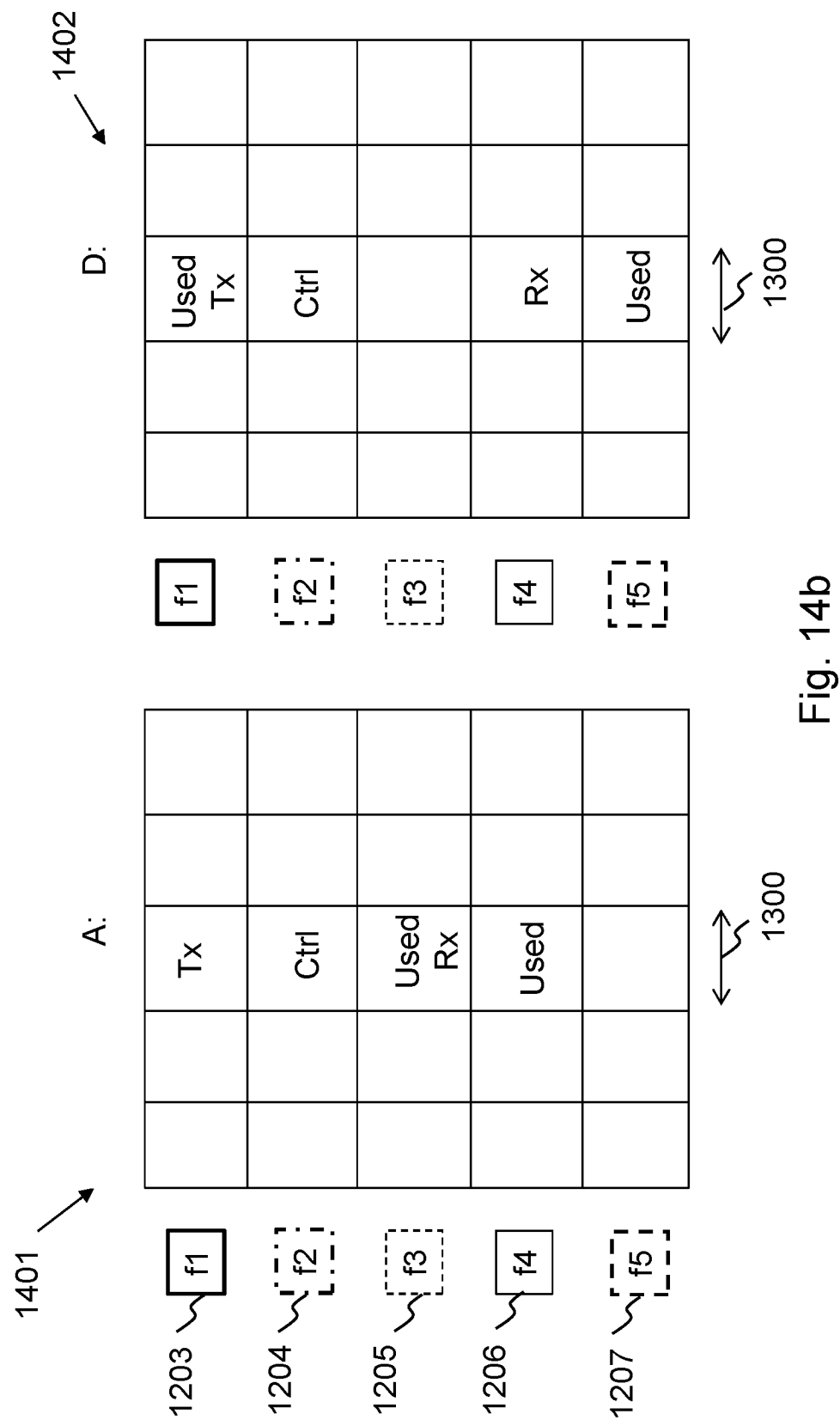
FIG. 14b shows the corresponding scheduling table.

FIG. 14*a* illustrates a sixth case. The frequency channels as presented in FIG. 12 still apply. FIG. 14*a* shows the state of a network 104 at a moment in time within timeslot 1300. The figure shows that in this case, node G transmits to node C. The other communications remain the same compared to the case of FIG. 13*a*. FIG. 14*b* shows the corresponding scheduling tables 1401 and 1402 maintained by the devices 200 of node A and D respectively. For the sake of clarity, only five timeslots are shown in the tables 1401 and 1402, and only the information kept in the tables for timeslot 1300 is shown in the figure.

If node A wants to accept a slot for reception from node D, it will consult its scheduling table 1401. Considering timeslot 1300, and assuming that all other timeslots are fully occupied, node D may propose the frequency channels 1203 (Used Tx) and 1205 (Empty). Node A cannot accept channel 1203, as it is marked as 'Tx' within its scheduling table 1401. Node A can accept channel 1205 however, as it is 'Used Rx' in its scheduling table 1401. This is allowed since node A is not able to hear transmitter G which is also transmitting at channel 1205 within timeslot 1300. Again, the same concept applies if all the time-frequency slots in the scheduling tables 1401 and 1402 are considered. In that case, available slots can be selected from the complete table.

Figure 15:
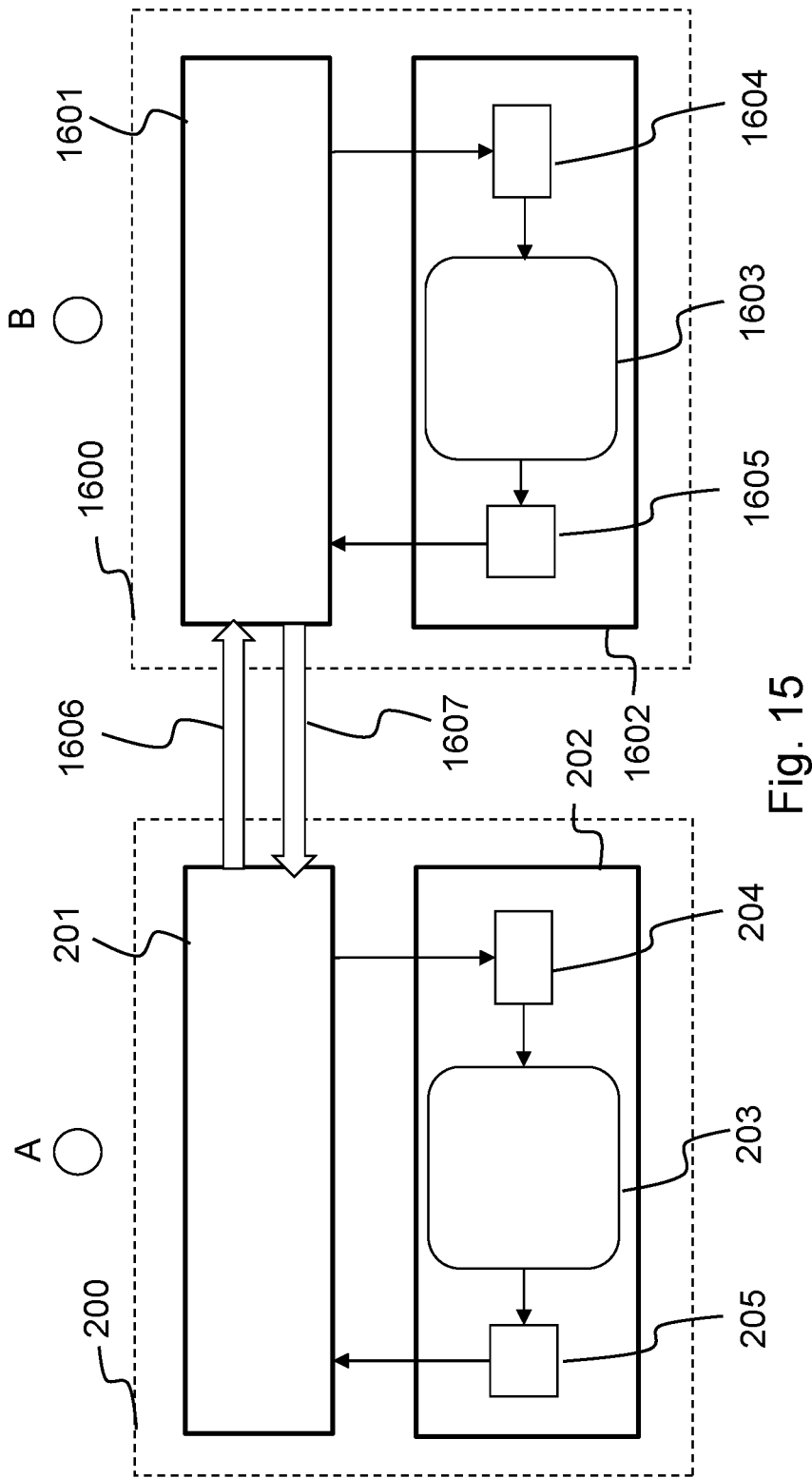
FIG. 15 schematically illustrates how a slot allocation procedure may be executed between the devices of two neighbour nodes, according to an embodiment of the invention.

FIG. 15 schematically illustrates how a slot allocation procedure may be executed between the devices 200 of two neighbour nodes A and B, according to an embodiment of the invention. The device 200 comprises a slot allocation module 201 and a registration module 202. The registration module 202 comprises a scheduling table 203, an editing component 204 and a reading component 205. As the figure is used to illustrate slot allocation, the information exchange module 210 is not shown in FIG. 15. Similarly, the device 1600 comprises a slot allocation module 1601, a registration module 1602, a scheduling table 1603, an editing component 1604 and a reading component 1605. The slot allocation module 201, 1601 is configured to allocate a slot for communication with a neighbour node by consulting the scheduling table 203, 1603 in a slot allocation procedure with that neighbour node. Such a slot allocation procedure may comprise the following steps, if node A wants to start transmission to node B:

Node A consults its scheduling 203 using the reading component 205, to get a view on the slots being available according to its scheduling table 203. Available slots comprise both empty slots 310 as well as slots 308 marked as 'Used Tx'.

From the available slots, node A selects one or more slots, which are proposed to node B by means of a control message 1606. In an embodiment, all slots being available according to the scheduling table 203 may be proposed.

Node B receives the control message 1606 and selects one slot from the proposed slots. This selected slot is referred to as the allocated slot. For selecting an allocated slot, node B consults its scheduling table 1603 using the reading component 1605. Slots that may be accepted for reception by node B are those slots being empty or being marked in its scheduling table 1603 as 'Used Rx'.

Node B updates its scheduling table 1603 using the editing component 1604, i.e. the allocated slot is marked as 'Rx' in the table 1603.

Node B transmits a control message 1607 to node A, reporting the allocated slot to node A. Node A receives the control message 1607 and uses this information to update its scheduling table 203. In the scheduling table 203, the allocated slot is being marked as 'Tx'.

For selecting one allocated slot from the proposed slots within a slot allocation procedure, different strategies may be applied in various embodiments. For example, the selection may be done at random. In another embodiment, a slot may be selected based on their position in the scheduling table, e.g. a strategy may be to first fill up all unused timeslots for a given channel, or to first fill up all unused frequencies within a certain timeslot. In yet another embodiment, priorities may be assigned to slots based on quality parameters. For example, if previous communications within a slot indicated a high packet error rate, that slot may be assigned a low priority, such that it will not easily be selected for allocation. In another example, spectrum monitoring is used to detect slots with high energy. Such slots are most likely occupied by an external network, and therefore get a low priority for allocation.

In an embodiment, restrictions due to the number of transceivers or the mode of a transceiver may be considered during slot allocation. For example, for nodes with only one transceiver working in half-duplex mode, a specific timeslot can only be used for one transmission, or for one reception, or for control. For nodes with one transceiver in full-duplex mode, it is allowed to use a timeslot for one Tx-Rx pair or control. For nodes with two transceivers in full-duplex, two Tx-Rx pairs or one Tx-Rx pair and one Ctrl slot may be allocated in one timeslot, etc. Thus, in this embodiment, depending on the number of transceivers and mode of the transceiver, not all empty slots, or slots marked as 'Used Tx', 'Used Rx' may be proposed or accepted.

The control messages 1606, 1607 exchanged during slot allocation are transmitted during one of the slots reserved for control, i.e. the slots 305 marked with 'Ctrl' in the scheduling table 203 of FIG. 3. Broadcasting may be used for communications within these control slots 305. This implies that all nodes of the network 104 are using the same time-frequency slot 305 for control, and every neighbour node 101 is able to receive information that is transmitted by a node 100 within a control slot 305. This allows neighbour nodes 101 to get updated about slots being allocated by a node 100, and to update their scheduling tables.

A broadcast protocol may be used to manage the access of a node to such a control slot 305. In various embodiments, different broadcast protocols may be used, like e.g. a pure or slotted aloha, polling, CSMA/CA, etc. In an embodiment, a timeout parameter may be defined in order to cope with the fact that different nodes may want to run a slot allocation procedure at the same time. For example, upon start of a slot allocation procedure, a node A may set a timeout in which it expects the procedure to finish. If the procedure is finished within that timeout, a next slot allocation procedure, within the same control slot, can start. If the procedure was not finished within the timeout, it means that control messages 1606, 1607 are colliding with control messages 1606, 1607 from other nodes. In that case node A waits until the timeout expires and thus backs off from using the control-broadcast slot 305 while it is under heavy use from other nodes in the network. After the back off period has expired, a next slot allocation procedure can be initiated. Optionally, after the timeout has expired, a node may still wait for a random period of time between a predefined Twait_min and Twait_max value before starting its slot allocation procedure. Such a randomness reduces the chance of nodes to start their slot allocation procedures at the same time.

In an embodiment, the slot allocation module 201 may also be configured to execute a slot release procedure. In such a slot release procedure, the activity within a slot 300 over consecutive superframes 304, may be monitored. The decision to release a particular slot may be initiated by a receiving node B, if a slot that has been allocated for reception remains idle within a predefined period of time. This indicates that the communication for which the slot was allocated has ended, and therefore can be released. Releasing a slot implies that the corresponding 'Rx' information in the scheduling table 1603 of receiving node B is deleted using the editing component 1604. Similarly, the 'Tx' information in the scheduling table 203 of the transmitting node A is deleted using the editing component 204. As such, after release the allocated slot is transformed into an empty slot.

In another embodiment, a slot release procedure may be initiated by a transmitting node. For example, a packet error rate for a 'Tx' slot may be determined for a predefined number of consecutive superframes 304. A packet error rate for a Tx slot may be calculated based on acknowledgement statistics. For having such acknowledgement statistics on a slot basis, every slot may be implemented to support fast acknowledgement of transmitted packets in that slot. Slots may also be configured in any other way, as long as there is a reliable way to calculate slot efficiency. If it is detected by a transmitting node that the packet error rate for the Tx slot is too high or slot efficiency is low, the slot is released. A high packet error rate may e.g. be caused by an external user causing interferences in this slot, or by the occurrence of internal interferences due to the displacement of nodes in the network. Again, the corresponding scheduling tables 203, 1603 are updated by making the released slot empty. The control messages exchanged during a slot release procedure are transmitted during one of the slots 305 reserved for control, and broadcasting within those slots 305 allows that neighbour nodes 101 get updated about the slot being released.

In an embodiment, the slot allocation module 201 may also be configured to execute a slot move procedure. Moving a slot implies that an allocated slot is released and next a new slot is assigned to the particular communication. For example, in the situation where an external user of the spectrum causes interferences within a particular slot, an allocated slot may be moved to another position in the scheduling table 203, where no such interferences occur. The control messages exchanged during a slot move procedure are transmitted during one of the slots 305 reserved for control, and broadcasting within those slots 305 allows that neighbour nodes 101 get updated about the slot being moved.

The information exchange module 210, as shown in FIG. 2, is configured to collect slot usage information 208 indicative for the use of slots 300 by neighbour nodes 101. In an embodiment, slot usage information 208 is collected during the slots 305 reserved for control. Different methods may be applied to collect slot usage information 208, for example:

In an embodiment, slot usage information 208 may be collected by listening to control messages 1606, 1607 exchanged by a neighbour node 101 during a slot allocation procedure. As broadcasting is used to transmit such control messages 1606, 1607, neighbour nodes 101 are able to receive them, and to update their scheduling tables based on the received information. Additionally, slot usage information may be collected by listening to control messages exchanged by a neighbour node 101 during a slot release or slot move procedure.

In another embodiment, the registration module 202 may comprise a sharing component 206, configured to periodically share content of the scheduling table 203 with neighbour nodes 101. Typically, only the information about the 'Tx' slots 306 and 'Rx' slots 307 is shared with neighbour nodes 101, as only one-hop information about slot usage is needed. Such sharing is done at predefined times within a broadcast-control slot 305. Sharing content of a scheduling table provides another way to update neighbour nodes about allocated slots and/or released slots and/or moved slots. A node 100 receiving such shared information from a neighbour node 101, is able to update its own scheduling table 203 based on the received information.

In yet another embodiment, slot usage information 208 may be collected based on both control messages exchanged by neighbour nodes 101, and the scheduling tables 203 periodically shared by neighbour nodes 101. The latter provides extra robustness against missing certain slot usage information due to mobility of the nodes or colliding control packets.

The number of control slots 305 and their position in the scheduling table 203 is chosen the same for all nodes participating in the network 104. For example, during boot time the number of control slots 305 and their position in the scheduling table 203 may be determined based on the available radio spectrum for the network 104 and based on the channelization of the available spectrum. The required number of control slots 305 depends on the total number of slots 300 in the scheduling table 203. When there are more frequency channels 302, more control slots 305 are needed to guarantee satisfying performance of the medium access control. Moreover, when more slots 300 are comprised in a scheduling table 203, it becomes feasible to allocate a higher number of control slots 305, as the reduction of slots for data communication becomes negligible.

The position of control slots 305 may be chosen in different ways. For example, their positions may be chosen such that they are far away from one another, both in time and frequency. In this way, if one control slot 305 is heavily interfered by external networks present in that part of the spectrum, slots in other parts of the spectrum are able to take over the control load.

In an embodiment, the device 200 comprises a component to receive one or more settings of network wide parameters and to configure the registration module 202 and/or information exchange module 210 and/or slot allocation module 201 according to these settings. Different network wide parameters may be involved, for example:

Parameters concerning the control slots 305, for example: the number of control slots 305, their position within the scheduling table 203, etc.

Parameter concerning the scheduling table 203, for example: the duration of the superframe 304, the number of timeslots 301, the number of channels 302, the timeslot duration, etc.

Parameters concerning the broadcast protocol used for communication within a control slot 305, for example: the type of broadcast protocol, a timeout value, a Twait_min and Twait_max value, etc.

Parameters concerning the periodic sharing of the scheduling table 203, e.g. the periodicity at which scheduling tables 203 are shared with neighbour nodes 101.

The network wide parameters mentioned above may be chosen in function of specific characteristics of the network 104 under consideration, or in function of specific requirements. For example:

A higher number of control slots 305 offers more opportunities for transmission of control messages, thus enabling satisfactory behaviour of larger wireless networks 104. On the other hand, an increased number of control slots 305 reduces the spectrum available for allocation of data slots, thus reducing the maximum throughput that can be achieved by the network 104.

Increasing the timeout parameter and/or the Twait_max value of a slot allocation procedure reduces the number of collisions in control-broadcast slots 305. On the other hand, it increases convergence time of the network 104 to a stable state.

Reducing the periodicity of sharing scheduling tables 203, allows neighbour nodes 101 to be quickly updated about released slots. Therefore, these slots can more quickly be reused by other nodes and a fast adaptation to network changes is obtained. On the other hand, it puts more stress on control-broadcast slots 503, and a larger number of such control slots 503 may be required.

In an embodiment, parameters concerning the broadcast protocol may be adapted during boot time. For example, for optimal performance of a slotted aloha protocol, nodes 100 need to know the exact number of neighbours 101. However, when the network 104 is just booted, nodes 100 are unaware of the number of the neighbour nodes 101. Thus, during bootstrapping, there is a high chance for collisions of control packets, until nodes gradually acquire knowledge of the approximate number of neighbours 101 based on the sharing of scheduling tables 203. Therefore, improved access to control-broadcast slots 305 in the initial phase of system bootstrapping can be achieved if the approximate size of the network 104 is known beforehand and used as an input parameter until nodes fine-tune this value during runtime FIG. 16 gives a schematic representation of a distributed system 1600 according to an embodiment of the invention. Each of the nodes of the network has a device 200, for managing the medium access control of that node. Medium access control is therefore done in a distributed way. On the other hand, the system 1600 shown in FIG. 16 comprises a centralized module 1601. The centralized module 1601 is configured to define optimal settings for network wide parameters, e.g. based on monitoring the actual conditions or performance of the network. Examples of network wide parameters are given above. The settings defined by the centralized module 1601 are transmitted to the various devices 200, in order to configure the registration module 202 and/or information exchange module 210 and/or slot allocation module 201 according to these settings.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A device for medium access control in a node of a wireless communication network with shared medium, comprising:
   a registration module, configured to maintain in a scheduling table information concerning a use of slots, comprising timeslots and/or frequency channels;
   an information exchange module, configured to collect slot usage information indicative of the use of said slots by neighbor nodes in a range of said node, and configured to update said scheduling table based on said slot usage information;
   a slot allocation module, configured to allocate a slot for communication with one of said neighbor nodes by consulting said scheduling table in a slot allocation procedure with said one of said neighbor nodes, resulting in an allocated slot, and configured to update said scheduling table based on said allocated slot,
   wherein said scheduling table information maintained in said scheduling table of said node is type information, specifying for a used slot a type of slot usage, said type of slot usage being selected from different types of slot usage, said different types of slot usage comprising:
      use of a slot by said node, indicating that said slot is used for transmission from said node to one of said neighbour nodes or is used for transmission from one of said neighbour nodes to said node;
      use of a slot by said neighbour nodes for transmission only, indicating that said slot is used by a transmitting neighbour node for transmission, but a receiving node, involved in the corresponding communication from said transmitting neighbour node, is out of range of said node;
      use of a slot by said neighbour nodes for reception only, indicating that said slot is used by a receiving neighbour node for reception, but the transmitting neighbour node, involved in the corresponding communication to said receiving neighbour node, is out of range of said node;
      use of a slot by said neighbour nodes for both transmission and reception, indicating that said slot is used by a transmitting node of said neighbour nodes for transmission and is used by a receiving node of said neighbour nodes for reception.

2. The device according to claim 1, where said slot allocation module is configured to propose a slot for transmission to one of said neighbor nodes based on said scheduling table, said slot being selected from empty slots and slots used by said neighbor nodes for transmission only.

3. The device according to claim 1, where said slot allocation module is configured to accept a slot for reception from one of said neighbor nodes based on said scheduling table, said slot being selected from empty slots and slots used by said neighbor nodes for reception only.

4. The device according to claim 1, where said slot allocation module is configured to release a slot allocated for communication in one or more of the following situations:
   when said slot remains idle for a predefined period, or when a predefined packet error rate is reached during communication within said slot.

5. The device according to claim 1, where said slot usage information is collected based on control messages transmitted by said neighbor nodes during slot allocation.

6. The device according to claim 5, where said slot usage information is collected based on said control messages and based on content of scheduling tables periodically shared by said neighbor nodes.

7. The device according to claim 1, where said registration module is configured to periodically share content of said scheduling table with said neighbor nodes.

8. The device according to claim 1, where a predefined selection of said slots is reserved for control, said control comprising collecting said slot usage information by said information exchange module, and running said slot allocation procedure by said slot allocation module.

9. The device according to claim 8, where the communication within said slots reserved for control makes use of a broadcast protocol.

10. The device according to claim 1, where said device is configured to receive one or more settings of network wide parameters and to configure said registration module and/or information exchange module and/or slot allocation module according to said settings.

11. The device according to claim 10, where said parameters comprise at least one of: parameters concerning said slots reserved for control, parameters concerning said scheduling table, parameters concerning said broadcast protocol, parameters concerning the periodic sharing of said scheduling table.

12. A distributed system for medium access control in a wireless communication network with shared medium, comprising a device according to claim 1 for each of the nodes of said communication network.

13. The distributed system according to claim 12, comprising a centralized module configured to define optimal settings for said network wide parameters and to transmit said settings to said device.

14. A method for medium access control in a node of a wireless communication network with shared medium, comprising:
   maintaining information concerning a use of slots in a scheduling table, said slots comprising timeslots and/or frequency channels;
   collecting slot usage information indicative of the use of said slots by neighbor nodes in a range of said node;
   updating said scheduling table based on said slot usage information;
   allocating a slot for communication with one of said neighbor nodes by consulting said scheduling table in a slot allocation procedure with said one of said neighbor nodes;
   updating said scheduling table based on said allocated slot,
   wherein said scheduling table information maintained in said scheduling table of said node is type information, specifying for a used slot a type of slot usage, said type of slot usage being selected from different types of slot usage, said different types of slot usage comprising:
      use of a slot by said node, indicating that said slot is used for transmission from said node to one of said neighbour nodes or is used for transmission from one of said neighbour nodes to said node;
      use of a slot by said neighbour nodes for transmission only, indicating that said slot is used by a transmitting neighbour node for transmission, but a receiving node, involved in the corresponding communication from said transmitting neighbour node, is out of range of said node;
      use of a slot by said neighbour nodes for reception only, indicating that said slot is used by a receiving neighbour node for reception, but the transmitting node, involved in the corresponding communication to said receiving neighbour node, is out of range of said node;

use of a slot by said neighbour nodes for both transmission and reception, indicating that said slot is used by a transmitting node of said neighbour nodes for transmission and is used by a receiving node of said neighbour nodes for reception.

15. A non-transitory computer-readable medium having computer-executable instructions stored thereon, which, when executed by one or more processors of a device, cause the one or more processors to perform at least the following:

maintaining information concerning a use of slots in a scheduling table, said slots comprising timeslots and/or frequency channels;

collecting slot usage information indicative of the use of said slots by neighbor nodes in a range of said node;

updating said scheduling table based on said slot usage information;

allocating a slot for communication with one of said neighbor nodes by consulting said scheduling table in a slot allocation procedure with said one of said neighbor nodes;

updating said scheduling table based on said allocated slot, wherein said scheduling table information maintained in said scheduling table of said node is type information, specifying for a used slot a type of slot usage, said type of slot usage being selected from different types of slot usage, said different types of slot usage comprising:

use of a slot by said node, indicating that said slot is used for transmission from said node to one of said neighbour nodes or is used for transmission from one of said neighbour nodes to said node;

use of a slot by said neighbour nodes for transmission only, indicating that a said slot is used by a transmitting neighbour node for transmission, but a receiving node, involved in the corresponding communication from said transmitting neighbour node, is out of range of said node;

use of a slot by said neighbour nodes for reception only, indicating that said slot is used by a receiving neighbour node for reception, but the transmitting neighbour node, involved in the corresponding communication to said receiving neighbour node, is out of range of said node;

use of a slot by said neighbour nodes for both transmission and reception, indicating that said slot is used by a transmitting node of said neighbour nodes for transmission and is used by a receiving node of said neighbour nodes for reception.

* * * * *